(12) United States Patent
Utsunomiya

(10) Patent No.: US 8,934,114 B2
(45) Date of Patent: Jan. 13, 2015

(54) IMAGE PROCESSING APPARATUS, IMAGE PROCESSING METHOD, AND PROGRAM

(71) Applicant: Canon Kabushiki Kaisha, Tokyo (JP)

(72) Inventor: Takehito Utsunomiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 13/914,305

(22) Filed: Jun. 10, 2013

(65) Prior Publication Data

US 2013/0335754 A1 Dec. 19, 2013

(30) Foreign Application Priority Data

Jun. 14, 2012 (JP) .................................. 2012-134836

(51) Int. Cl.
*G06K 15/00* (2006.01)
*H04N 1/04* (2006.01)
*H04N 1/40* (2006.01)
*H04N 1/58* (2006.01)
*H04N 1/00* (2006.01)
*H04N 1/047* (2006.01)

(52) U.S. Cl.
CPC ......... *H04N 1/00809* (2013.01); *H04N 1/0058* (2013.01); *H04N 1/00586* (2013.01); *H04N 1/0473* (2013.01); *H04N 2201/044* (2013.01); *H04N 2201/04755* (2013.01); *H04N 2201/0091* (2013.01)
USPC ............................ 358/1.14; 358/497; 358/461

(58) Field of Classification Search
CPC .......... H04N 2201/04755; H04N 2201/04793; H04N 1/0058; H04N 1/00586; H04N 1/00809; H04N 1/0473; H04N 2201/0091; H04N 2201/044
USPC .................................. 358/1.1–1.9, 1.11–1.18
See application file for complete search history.

(56) References Cited

U.S. PATENT DOCUMENTS 7,466,457 B2 * 12/2008 Chen .............................. 358/461
7,525,692 B2 * 4/2009 Nakaya ......................... 358/461
8,164,804 B2 * 4/2012 Tanaka et al. ................. 358/474

FOREIGN PATENT DOCUMENTS

JP 2002-290686 A 10/2002

* cited by examiner

*Primary Examiner* — King Poon
*Assistant Examiner* — Ibrahim Siddo
(74) *Attorney, Agent, or Firm* — Canon USA Inc IP Division

(57) ABSTRACT

An image reading unit configured to rotate and read a front and a back of a document may deviate from an original reading position due to aged deterioration or an external physical impact and become incapable of reading an image accurately. An image processing apparatus rotates an image reading unit including a sensor in units of predetermined angles to read a white reference member, acquires luminance information about the white reference member at the respective predetermined angles of rotation, determines an angle at which the luminance information is greater than other pieces of the luminance information among a plurality of pieces of the acquired luminance information at the respective predetermined angles, and rotates the image reading unit based on the determined angle to correct a reference position of the image reading unit.

9 Claims, 28 Drawing Sheets

FIG.13

| ROTATION ANGLE θ | RECEIVED LIGHT AMOUNT |
|---|---|
| -50 | 10 |
| -49 | 10 |
| -48 | 10 |
| -47 | 114 |
| -46 | 116 |
| -45 | 118 |
| -44 | 120 |
| -43 | 122 |
| -42 | 125 |
| -41 | 127 |
| -5 | 212 |
| -4 | 216 |
| -3 | 219 |
| -2 | 221 |
| -1 | 219 |
| 0 | 216 |
| +1 | 212 |
| +2 | 210 |
| +3 | 208 |
| +4 | 204 |
| +5 | 202 |
| +41 | 127 |
| +42 | 123 |
| +43 | 120 |
| +44 | 10 |
| +45 | 10 |
| +46 | 10 |
| +47 | 10 |
| +48 | 10 |
| +49 | 10 |
| +50 | 10 |

| ROTATION ANGLE θ (1401) | RECEIVED LIGHT AMOUNT (1402) |
|---|---|
| -15 DEGREES | 170 |
| -14 DEGREES | 173 |
| -13 DEGREES | 175 |
| -2 DEGREES | 205 |
| -1 DEGREE | 208 |
| 0 DEGREES | 210 |
| +1 DEGREE | 208 |
| +2 DEGREES | 205 |
| +3 DEGREES | 201 |
| +13 DEGREES | 175 |
| +14 DEGREES | 173 |
| +15 DEGREES | 170 |

| ROTATION ANGLE θ | RECEIVED LIGHT AMOUNT |
|---|---|
| -15 DEGREES | 175 |
| -14 DEGREES | 177 |
| -13 DEGREES | 180 |
| -2 DEGREES | 210 |
| -1 DEGREE | 208 |
| 0 DEGREES | 205 |
| +1 DEGREE | 201 |
| +2 DEGREES | 199 |
| +3 DEGREES | 197 |
| +13 DEGREES | 170 |
| +14 DEGREES | 167 |
| +15 DEGREES | 166 |

1404 — (-2 DEGREES row) — 1403

1411

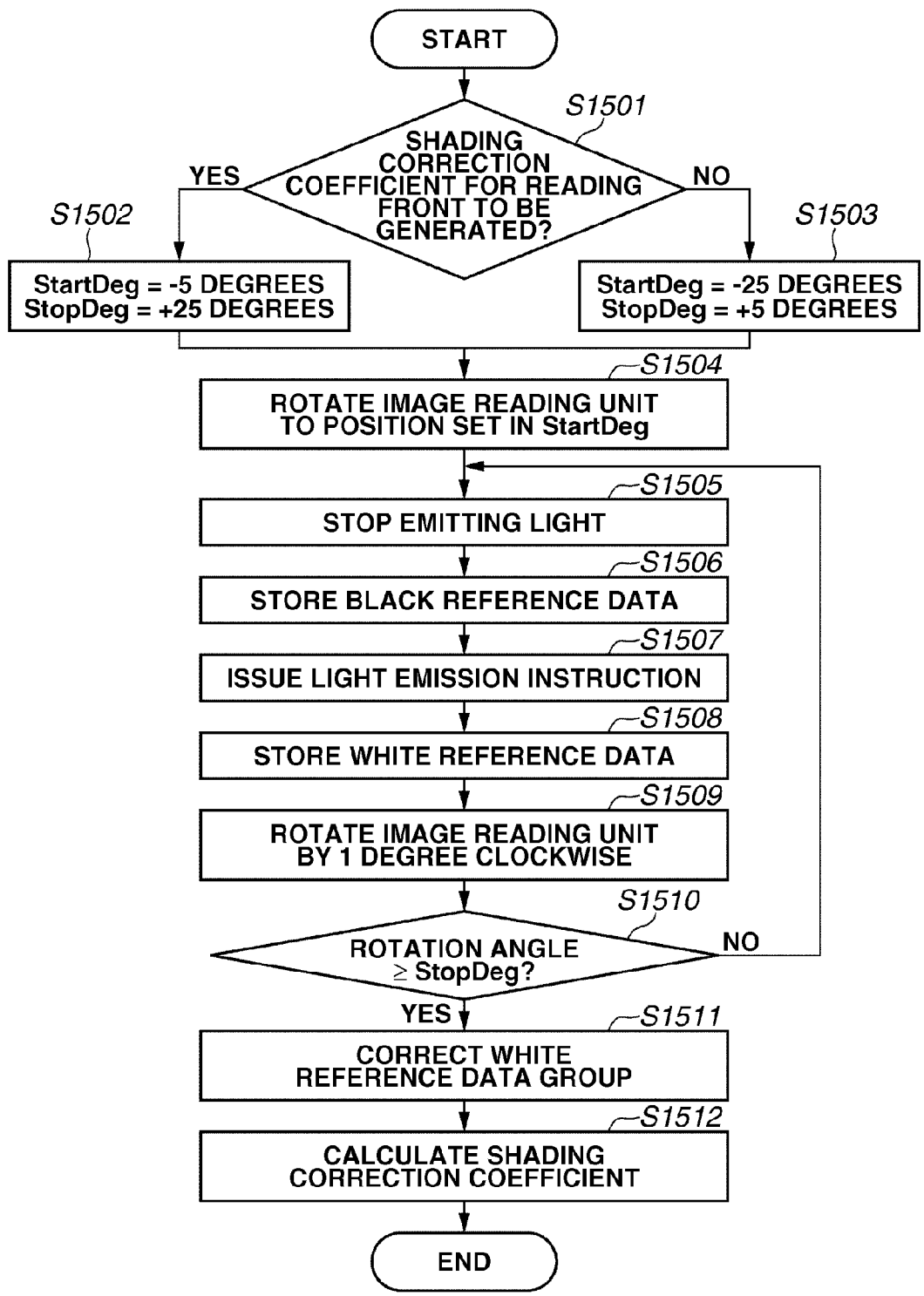

FIG.16

| ROTATION ANGLE θ | CORRECTION COEFFICIENT |
|---|---|
| -25 DEGREES | 1.411 |
| -24 DEGREES | 1.407 |
| -23 DEGREES | 1.402 |
| -2 DEGREES | 1.024 |
| -1 DEGREE | 1.009 |
| 0 DEGREES | 1.000 |
| +1 DEGREE | 1.009 |
| +2 DEGREES | 1.024 |
| +3 DEGREES | 1.039 |
| +23 DEGREES | 1.402 |
| +24 DEGREES | 1.407 |
| +25 DEGREES | 1.411 |

FIG.17A

<table>
<tr><th colspan="2" rowspan="2"></th><th colspan="9">SENSOR PIXEL No. 1710</th></tr>
<tr><th>0</th><th>1</th><th>2</th><th>3</th><th>4</th><th>5</th><th>10365</th><th>10366</th><th>10367</th></tr>
<tr><td rowspan="31">ROTATION ANGLE θ</td><td>-25</td><td>10</td><td>10</td><td>10</td><td>10</td><td>10</td><td>10</td><td>10</td><td>10</td><td>10</td></tr>
<tr><td>-24</td><td>10</td><td>10</td><td>10</td><td>10</td><td>10</td><td>10</td><td>10</td><td>10</td><td>10</td></tr>
<tr><td>-23</td><td>9</td><td>10</td><td>10</td><td>10</td><td>10</td><td>10</td><td>10</td><td>10</td><td>10</td></tr>
<tr><td>-22</td><td>10</td><td>10</td><td>12</td><td>11</td><td>10</td><td>10</td><td>10</td><td>10</td><td>10</td></tr>
<tr><td>-21</td><td>10</td><td>10</td><td>10</td><td>11</td><td>10</td><td>10</td><td>10</td><td>11</td><td>10</td></tr>
<tr><td>-20</td><td>10</td><td>10</td><td>10</td><td>11</td><td>10</td><td>10</td><td>10</td><td>10</td><td>10</td></tr>
<tr><td>-19</td><td>10</td><td>10</td><td>9</td><td>11</td><td>10</td><td>10</td><td>10</td><td>10</td><td>10</td></tr>
<tr><td>-18</td><td>10</td><td>10</td><td>11</td><td>11</td><td>11</td><td>10</td><td>10</td><td>10</td><td>10</td></tr>
<tr><td>-17</td><td>10</td><td>10</td><td>10</td><td>11</td><td>10</td><td>10</td><td>10</td><td>10</td><td>10</td></tr>
<tr><td>-16</td><td>10</td><td>10</td><td>10</td><td>11</td><td>10</td><td>9</td><td>10</td><td>10</td><td>10</td></tr>
<tr><td>-15</td><td>10</td><td>10</td><td>10</td><td>10</td><td>10</td><td>10</td><td>10</td><td>9</td><td>10</td></tr>
<tr><td>-14</td><td>10</td><td>10</td><td>10</td><td>10</td><td>10</td><td>10</td><td>10</td><td>10</td><td>10</td></tr>
<tr><td>-13</td><td>11</td><td>9</td><td>10</td><td>10</td><td>10</td><td>10</td><td>11</td><td>10</td><td>10</td></tr>
<tr><td>-12</td><td>10</td><td>10</td><td>10</td><td>9</td><td>10</td><td>10</td><td>10</td><td>10</td><td>10</td></tr>
<tr><td>-11</td><td>10</td><td>10</td><td>10</td><td>10</td><td>10</td><td>10</td><td>10</td><td>10</td><td>10</td></tr>
<tr><td>-10</td><td>10</td><td>9</td><td>10</td><td>10</td><td>10</td><td>10</td><td>10</td><td>10</td><td>10</td></tr>
<tr><td>-9</td><td>10</td><td>10</td><td>11</td><td>10</td><td>10</td><td>10</td><td>10</td><td>10</td><td>10</td></tr>
<tr><td>-8</td><td>10</td><td>10</td><td>10</td><td>10</td><td>11</td><td>10</td><td>10</td><td>10</td><td>10</td></tr>
<tr><td>-7</td><td>10</td><td>10</td><td>10</td><td>10</td><td>12</td><td>10</td><td>10</td><td>10</td><td>10</td></tr>
<tr><td>-6</td><td>10</td><td>10</td><td>10</td><td>14</td><td>13</td><td>10</td><td>10</td><td>10</td><td>9</td></tr>
<tr><td>-5</td><td>10</td><td>9</td><td>10</td><td>14</td><td>14</td><td>10</td><td>10</td><td>10</td><td>10</td></tr>
<tr><td>-4</td><td>10</td><td>10</td><td>9</td><td>10</td><td>15</td><td>10</td><td>11</td><td>10</td><td>10</td></tr>
<tr><td>-3</td><td>10</td><td>10</td><td>10</td><td>10</td><td>10</td><td>10</td><td>10</td><td>10</td><td>10</td></tr>
<tr><td>-2</td><td>10</td><td>10</td><td>10</td><td>10</td><td>10</td><td>10</td><td>10</td><td>10</td><td>10</td></tr>
<tr><td>-1</td><td>10</td><td>9</td><td>10</td><td>10</td><td>11</td><td>10</td><td>10</td><td>10</td><td>10</td></tr>
<tr><td>0</td><td>10</td><td>10</td><td>10</td><td>10</td><td>10</td><td>10</td><td>10</td><td>10</td><td>10</td></tr>
<tr><td>+1</td><td>11</td><td>9</td><td>10</td><td>10</td><td>10</td><td>10</td><td>10</td><td>10</td><td>10</td></tr>
<tr><td>+2</td><td>10</td><td>11</td><td>10</td><td>9</td><td>10</td><td>10</td><td>9</td><td>10</td><td>10</td></tr>
<tr><td>+3</td><td>10</td><td>10</td><td>10</td><td>10</td><td>10</td><td>10</td><td>10</td><td>10</td><td>10</td></tr>
<tr><td>+4</td><td>10</td><td>8</td><td>10</td><td>10</td><td>10</td><td>10</td><td>10</td><td>10</td><td>10</td></tr>
<tr><td>+5</td><td>10</td><td>10</td><td>10</td><td>10</td><td>10</td><td>10</td><td>10</td><td>10</td><td>10</td></tr>
</table>

FIG.17B

| | | \multicolumn{9}{c|}{SENSOR PIXEL No.} |
|---|---|---|---|---|---|---|---|---|---|---|
| | | 0 | 1 | 2 | 3 | 4 | 5 | 10365 | 10366 | 10367 |
| ROTATION ANGLE θ | -5 | 10 | 9 | 10 | 14 | 14 | 10 | 10 | 10 | 10 |
| | -4 | 10 | 10 | 9 | 10 | 15 | 10 | 11 | 10 | 10 |
| | -3 | 10 | 10 | 10 | 10 | 10 | 10 | 10 | 10 | 10 |
| | -2 | 13 | 10 | 10 | 10 | 10 | 10 | 10 | 10 | 10 |
| | -1 | 10 | 9 | 10 | 10 | 11 | 10 | 10 | 10 | 10 |
| | 0 | 10 | 10 | 10 | 10 | 10 | 10 | 10 | 10 | 10 |
| | +1 | 11 | 9 | 10 | 10 | 10 | 10 | 10 | 9 | 10 |
| | +2 | 10 | 11 | 10 | 9 | 10 | 10 | 9 | 9 | 10 |
| | +3 | 10 | 10 | 10 | 10 | 10 | 10 | 10 | 9 | 10 |
| | +4 | 10 | 8 | 10 | 10 | 10 | 10 | 10 | 9 | 10 |
| | +5 | 10 | 10 | 10 | 10 | 10 | 10 | 10 | 9 | 10 |
| | +6 | 10 | 10 | 10 | 10 | 10 | 10 | 10 | 9 | 10 |
| | +7 | 11 | 10 | 10 | 10 | 10 | 10 | 11 | 9 | 10 |
| | +8 | 10 | 10 | 10 | 9 | 10 | 10 | 10 | 9 | 10 |
| | +9 | 10 | 10 | 10 | 10 | 10 | 10 | 10 | 9 | 10 |
| | +10 | 10 | 10 | 10 | 10 | 10 | 10 | 10 | 9 | 10 |
| | +11 | 10 | 10 | 10 | 10 | 10 | 10 | 10 | 9 | 10 |
| | +12 | 10 | 10 | 10 | 10 | 10 | 10 | 10 | 9 | 10 |
| | +13 | 12 | 10 | 10 | 10 | 10 | 10 | 10 | 10 | 10 |
| | +14 | 10 | 10 | 10 | 10 | 10 | 10 | 10 | 10 | 9 |
| | +15 | 10 | 10 | 10 | 10 | 10 | 10 | 10 | 8 | 10 |
| | +16 | 10 | 10 | 9 | 10 | 10 | 10 | 11 | 8 | 10 |
| | +17 | 11 | 10 | 10 | 10 | 10 | 10 | 10 | 8 | 10 |
| | +18 | 10 | 10 | 10 | 10 | 10 | 10 | 10 | 8 | 10 |
| | +19 | 11 | 10 | 10 | 10 | 11 | 10 | 10 | 10 | 10 |
| | +20 | 11 | 10 | 10 | 10 | 10 | 10 | 10 | 10 | 10 |
| | +21 | 11 | 10 | 10 | 10 | 10 | 10 | 10 | 10 | 10 |
| | +22 | 11 | 11 | 10 | 9 | 10 | 10 | 9 | 10 | 10 |
| | +23 | 11 | 10 | 10 | 10 | 10 | 10 | 10 | 10 | 10 |
| | +24 | 11 | 10 | 10 | 10 | 10 | 10 | 10 | 10 | 10 |
| | +25 | 13 | 10 | 10 | 10 | 10 | 10 | 10 | 10 | 10 |

FIG.18B

| | | \multicolumn{9}{c|}{SENSOR PIXEL No.} |
|---|---|---|---|---|---|---|---|---|---|---|
| | | 0 | 1 | 2 | 3 | 4 | 5 | 10365 | 10366 | 10367 |
| ROTATION ANGLE θ | -5 | 197 | 195 | 199 | 209 | 196 | 197 | 198 | 202 | 208 |
| | -4 | 199 | 198 | 201 | 211 | 198 | 199 | 200 | 210 | 210 |
| | -3 | 200 | 199 | 203 | 200 | 200 | 201 | 202 | 206 | 212 |
| | -2 | 205 | 203 | 207 | 217 | 204 | 205 | 206 | 210 | 216 |
| | -1 | 208 | 210 | 210 | 220 | 207 | 208 | 209 | 213 | 219 |
| | 0 | 210 | 208 | 212 | 222 | 209 | 210 | 211 | 215 | 221 |
| | +1 | 208 | 206 | 210 | 220 | 207 | 208 | 220 | 213 | 219 |
| | +2 | 205 | 203 | 207 | 210 | 204 | 205 | 206 | 200 | 216 |
| | +3 | 211 | 203 | 203 | 213 | 200 | 201 | 202 | 206 | 212 |
| | +4 | 199 | 198 | 201 | 211 | 198 | 199 | 200 | 204 | 210 |
| | +5 | 198 | 195 | 199 | 209 | 196 | 197 | 198 | 202 | 208 |
| | +6 | 193 | 191 | 195 | 204 | 192 | 193 | 194 | 198 | 203 |
| | +7 | 190 | 189 | 192 | 201 | 189 | 190 | 191 | 195 | 200 |
| | +8 | 187 | 186 | 189 | 198 | 186 | 187 | 188 | 192 | 197 |
| | +9 | 185 | 183 | 186 | 195 | 184 | 185 | 185 | 189 | 194 |
| | +10 | 182 | 180 | 183 | 192 | 181 | 182 | 183 | 186 | 191 |
| | +11 | 180 | 178 | 182 | 190 | 179 | 180 | 181 | 184 | 190 |
| | +12 | 177 | 175 | 179 | 187 | 176 | 177 | 178 | 181 | 186 |
| | +13 | 175 | 173 | 176 | 185 | 174 | 175 | 176 | 179 | 184 |
| | +14 | 173 | 171 | 174 | 183 | 172 | 173 | 174 | 177 | 182 |
| | +15 | 170 | 169 | 172 | 180 | 169 | 170 | 171 | 174 | 179 |
| | +16 | 167 | 165 | 169 | 177 | 166 | 167 | 168 | 171 | 176 |
| | +17 | 166 | 164 | 167 | 175 | 165 | 166 | 167 | 170 | 175 |
| | +18 | 163 | 162 | 165 | 172 | 162 | 163 | 164 | 167 | 172 |
| | +19 | 161 | 160 | 163 | 171 | 161 | 161 | 162 | 165 | 170 |
| | +20 | 159 | 157 | 160 | 168 | 158 | 159 | 159 | 162 | 167 |
| | +21 | 155 | 154 | 156 | 164 | 154 | 155 | 156 | 159 | 163 |
| | +22 | 152 | 151 | 154 | 161 | 152 | 152 | 153 | 156 | 160 |
| | +23 | 150 | 148 | 151 | 158 | 149 | 150 | 150 | 153 | 158 |
| | +24 | 149 | 148 | 151 | 158 | 149 | 149 | 150 | 153 | 157 |
| | +25 | 149 | 147 | 150 | 157 | 148 | 149 | 150 | 152 | 157 |

| | | \ 1901 SENSOR PIXEL No. 1910 | | | | | | | | |
|---|---|---|---|---|---|---|---|---|---|---|
| | | 0 | 1 | 2 | 3 | 4 | 5 | 10365 | 10366 | 10367 |
| ROTATION ANGLE θ | -25 | 205 | 208 | 212 | 222 | 209 | 210 | 211 | 215 | 221 |
| | -24 | 210 | 208 | 212 | 222 | 209 | 210 | 211 | 215 | 221 |
| | -23 | 210 | 208 | 212 | 222 | 209 | 210 | 211 | 252 | 221 |
| | -22 | 210 | 214 | 212 | 222 | 209 | 210 | 211 | 215 | 221 |
| | -21 | 210 | 208 | 212 | 222 | 209 | 210 | 211 | 215 | 221 |
| | -20 | 210 | 208 | 212 | 222 | 209 | 210 | 211 | 215 | 221 |
| | -19 | 210 | 211 | 212 | 233 | 209 | 210 | 211 | 215 | 234 |
| | -18 | 208 | 208 | 212 | 222 | 209 | 210 | 211 | 215 | 221 |
| | -17 | 210 | 208 | 212 | 222 | 209 | 210 | 211 | 215 | 221 |
| | -16 | 210 | 208 | 212 | 222 | 209 | 210 | 211 | 215 | 221 |
| | -15 | 210 | 208 | 212 | 222 | 209 | 210 | 211 | 215 | 221 |
| | -14 | 210 | 208 | 212 | 219 | 209 | 210 | 211 | 215 | 221 |
| | -13 | 212 | 208 | 212 | 222 | 209 | 210 | 211 | 215 | 228 |
| | -12 | 210 | 208 | 212 | 222 | 209 | 198 | 211 | 215 | 221 |
| | -11 | 210 | 208 | 212 | 222 | 209 | 210 | 211 | 215 | 221 |
| | -10 | 210 | 208 | 212 | 222 | 209 | 210 | 211 | 215 | 221 |
| | -9 | 210 | 208 | 212 | 222 | 209 | 210 | 211 | 217 | 221 |
| | -8 | 213 | 208 | 212 | 213 | 209 | 210 | 211 | 215 | 221 |
| | -7 | 210 | 210 | 212 | 222 | 209 | 210 | 211 | 215 | 221 |
| | -6 | 210 | 208 | 212 | 222 | 209 | 210 | 211 | 215 | 221 |
| | -5 | 210 | 208 | 212 | 222 | 209 | 210 | 211 | 215 | 221 |
| | -4 | 210 | 208 | 212 | 222 | 209 | 210 | 211 | 221 | 221 |
| | -3 | 209 | 208 | 212 | 209 | 209 | 210 | 211 | 215 | 221 |
| | -2 | 210 | 208 | 212 | 222 | 209 | 210 | 211 | 215 | 221 |
| | -1 | 210 | 212 | 212 | 222 | 209 | 210 | 211 | 215 | 221 |
| | 0 | 210 | 208 | 212 | 222 | 209 | 210 | 211 | 215 | 221 |
| | +1 | 210 | 208 | 212 | 222 | 209 | 210 | 222 | 215 | 221 |
| | +2 | 210 | 208 | 212 | 215 | 209 | 210 | 211 | 205 | 221 |
| | +3 | 220 | 212 | 212 | 222 | 209 | 210 | 211 | 215 | 221 |
| | +4 | 210 | 208 | 212 | 222 | 209 | 210 | 211 | 215 | 221 |
| | +5 | 211 | 208 | 212 | 222 | 209 | 210 | 211 | 215 | 221 |

| | | SENSOR PIXEL No. | | | | | | | | | |
|---|---|---|---|---|---|---|---|---|---|---|---|
| | | 0 | 1 | 2 | 3 | 4 | 5 | | 10365 | 10366 | 10367 |
| | -5 | 210 | 208 | 212 | 222 | 209 | 210 | | 211 | 215 | 221 |
| | -4 | 210 | 208 | 212 | 222 | 209 | 210 | | 211 | 221 | 221 |
| | -3 | 209 | 208 | 212 | 209 | 209 | 210 | | 211 | 215 | 221 |
| | -2 | 210 | 208 | 212 | 222 | 209 | 210 | | 211 | 215 | 221 |
| | -1 | 210 | 212 | 212 | 222 | 209 | 210 | | 211 | 215 | 221 |
| | 0 | 210 | 208 | 212 | 222 | 209 | 210 | | 211 | 215 | 221 |
| | +1 | 210 | 208 | 212 | 222 | 209 | 210 | | 222 | 215 | 221 |
| | +2 | 210 | 208 | 212 | 215 | 209 | 210 | | 211 | 205 | 221 |
| | +3 | 220 | 212 | 212 | 222 | 209 | 210 | | 211 | 215 | 221 |
| | +4 | 210 | 208 | 212 | 222 | 209 | 210 | | 211 | 215 | 221 |
| | +5 | 211 | 208 | 212 | 222 | 209 | 210 | | 211 | 215 | 221 |
| | +6 | 210 | 208 | 212 | 222 | 209 | 210 | | 211 | 215 | 221 |
| | +7 | 210 | 208 | 212 | 222 | 209 | 210 | | 211 | 215 | 221 |
| | +8 | 210 | 208 | 212 | 222 | 209 | 210 | | 211 | 215 | 221 |
| | +9 | 210 | 208 | 212 | 222 | 209 | 210 | | 211 | 215 | 221 |
| ROTATION ANGLE θ | +10 | 210 | 208 | 212 | 222 | 209 | 210 | | 211 | 215 | 221 |
| | +11 | 210 | 208 | 212 | 222 | 209 | 210 | | 211 | 215 | 221 |
| | +12 | 210 | 208 | 212 | 222 | 209 | 210 | | 211 | 215 | 221 |
| | +13 | 210 | 208 | 212 | 222 | 209 | 210 | | 211 | 215 | 221 |
| | +14 | 210 | 208 | 212 | 222 | 209 | 210 | | 211 | 215 | 221 |
| | +15 | 210 | 208 | 212 | 222 | 209 | 210 | | 211 | 215 | 221 |
| | +16 | 210 | 208 | 212 | 222 | 209 | 210 | | 211 | 215 | 221 |
| | +17 | 210 | 208 | 212 | 222 | 209 | 210 | | 211 | 215 | 221 |
| | +18 | 210 | 208 | 212 | 222 | 209 | 210 | | 211 | 215 | 221 |
| | +19 | 210 | 208 | 212 | 222 | 209 | 210 | | 211 | 215 | 221 |
| | +20 | 210 | 208 | 212 | 222 | 209 | 210 | | 211 | 215 | 221 |
| | +21 | 210 | 208 | 212 | 222 | 209 | 210 | | 211 | 215 | 221 |
| | +22 | 210 | 208 | 212 | 222 | 209 | 210 | | 211 | 215 | 221 |
| | +23 | 210 | 208 | 212 | 222 | 209 | 210 | | 211 | 215 | 221 |
| | +24 | 210 | 208 | 212 | 222 | 209 | 210 | | 211 | 215 | 221 |
| | +25 | 210 | 208 | 212 | 222 | 209 | 210 | | 211 | 215 | 221 |

FIG.20A

| | SENSOR PIXEL No. | | | | | | | | | |
|---|---|---|---|---|---|---|---|---|---|---|
| | 0 | 1 | 2 | 3 | 4 | 5 | | 10365 | 10366 | 10367 |
| BLACK REFERENCE CORRECTION VALUE | 10 | 10 | 10 | 10 | 11 | 10 | | 10 | 10 | 10 |

FIG.20B

| | SENSOR PIXEL No. | | | | | | | | | |
|---|---|---|---|---|---|---|---|---|---|---|
| | 0 | 1 | 2 | 3 | 4 | 5 | | 10365 | 10366 | 10367 |
| BLACK REFERENCE CORRECTION VALUE | 11 | 10 | 10 | 10 | 10 | 10 | | 10 | 9 | 10 |

FIG.20C

| | SENSOR PIXEL No. | | | | | | | | | |
|---|---|---|---|---|---|---|---|---|---|---|
| | 0 | 1 | 2 | 3 | 4 | 5 | | 10365 | 10366 | 10367 |
| WHITE REFERENCE CORRECTION VALUE | 210 | 209 | 212 | 221 | 209 | 210 | | 211 | 216 | 222 |

FIG.20D

| | SENSOR PIXEL No. | | | | | | | | | |
|---|---|---|---|---|---|---|---|---|---|---|
| | 0 | 1 | 2 | 3 | 4 | 5 | | 10365 | 10366 | 10367 |
| WHITE REFERENCE CORRECTION VALUE | 210 | 208 | 212 | 221 | 209 | 210 | | 211 | 215 | 221 |

| ROTATION ANGLE θ | RECEIVED LIGHT AMOUNT |
|---|---|
| -15 DEGREES | 166 |
| -14 DEGREES | 167 |
| -13 DEGREES | 170 |
| -2 DEGREES | 199 |
| -1 DEGREE | 200 |
| 0 DEGREES | 205 |
| +1 DEGREE | 208 |
| +2 DEGREES | 210 |
| +3 DEGREES | 208 |
| +13 DEGREES | 180 |
| +14 DEGREES | 177 |
| +15 DEGREES | 175 |

| ROTATION ANGLE θ | RECEIVED LIGHT AMOUNT |
|---|---|
| -15 DEGREES | 170 |
| -14 DEGREES | 173 |
| -13 DEGREES | 175 |
| -2 DEGREES | 205 |
| -1 DEGREE | 208 |
| 0 DEGREES | 210 |
| +1 DEGREE | 208 |
| +2 DEGREES | 205 |
| +3 DEGREES | 201 |
| +13 DEGREES | 175 |
| +14 DEGREES | 173 |
| +15 DEGREES | 170 |

| ROTATION ANGLE θ | RECEIVED LIGHT AMOUNT |
|---|---|
| -15 DEGREES | 175 |
| -14 DEGREES | 177 |
| -13 DEGREES | 179 |
| -2 DEGREES | 210 |
| -1 DEGREE | 208 |
| 0 DEGREES | 205 |
| +1 DEGREE | 201 |
| +2 DEGREES | 198 |
| +3 DEGREES | 197 |
| +13 DEGREES | 170 |
| +14 DEGREES | 167 |
| +15 DEGREES | 166 |

IMAGE PROCESSING APPARATUS, IMAGE PROCESSING METHOD, AND PROGRAM

BACKGROUND OF THE INVENTION

1. Field of the Invention

The present disclosure relates to an image processing apparatus, an image processing method, and a program.

2. Description of the Related Art

In a conventional rotational position control of a rotating member, a position control of the rotating member has been performed by forming a mark having a different density or a physical groove in a certain position of the rotating body and providing a detection sensor or other detection unit for detecting the mark or groove in a position facing to the rotating body (Japanese Patent Application Laid-Open No. 2002-290686).

According to Japanese Patent Application Laid-Open No. 2002-290686, a recessed portion is formed on a reading roller, and a detection sensor reads the recessed portion to perform a rotational position control of the rotating member. To detect a rotational position, it has been necessary to form the recessed portion on the reading roller and further provide the dedicated detection sensor.

SUMMARY OF THE INVENTION

An embodiment of the present invention is directed to a technique capable of easily detecting and correcting a positional deviation of an image reading unit in a case where the image reading unit is rotated to read a white reference member.

According to an aspect of the present invention, an image processing apparatus includes an acquisition unit configured to rotate an image reading unit including a sensor in units of predetermined angles to read a white reference member and acquire luminance information about the white reference member at the respective predetermined angles of rotation, a determination unit configured to determine an angle at which the luminance information is greater than other pieces of the luminance information among a plurality of pieces of the luminance information acquired by the acquisition unit at the respective predetermined angles, and a correction unit configured to rotate the image reading unit based on the angle determined by the determination unit to correct a reference position of the image reading unit.

According to another aspect of the present invention, an image processing apparatus includes an acquisition unit configured to rotate an image reading unit including a sensor in units of predetermined angles to read a white reference member and acquire luminance information about the white reference member at the respective predetermined angles of rotation, a determination unit configured to determine an angle at which an amount of change of the luminance information is greater than or equal to a predetermined value among a plurality of pieces of the luminance information acquired by the acquisition unit at the respective predetermined angles, and a rotation control unit configured to calculate a tilt angle of the image reading unit based on the angle determined by the determination unit, and rotate the image reading unit to correct the calculated tilt angle.

According to an embodiment of the present invention, an angle of the reference position of the image reading unit can be easily detected and corrected when the image reading image is rotated to read the white reference member.

Further features of the present invention will become apparent from the following description of exemplary embodiments with reference to the attached drawings.

BRIEF DESCRIPTION OF THE DRAWINGS

FIG. 13 illustrates a correspondence between a rotation angle of the image reading unit and an amount of received light according to a third exemplary embodiment.

FIGS. 14A and 14B illustrate a correspondence between the rotation angle of the image reading unit and the amount of received light according to the first exemplary embodiment.

FIG. 15 is a flowchart for a shading correction program.

FIG. 16 illustrates correction coefficients at respective rotation angles of the image reading unit.

FIGS. 17A and 17B illustrate black reference data groups of light received by a contact image sensor (CIS) according to the first exemplary embodiment.

FIGS. 18A and 18B illustrate white reference data groups of the light received by the CIS according to the first exemplary embodiment.

FIGS. 19A and 19B illustrate white reference data groups corrected with use of correction coefficients according to the first exemplary embodiment.

FIGS. 20A to 20D illustrate black reference correction values and white reference correction values according to the first exemplary embodiment.

FIGS. 23A to 23C illustrate a correspondence between the rotation angle of the image reading unit and the amount of received light according to the second exemplary embodiment.

DESCRIPTION OF THE EMBODIMENTS

Various exemplary embodiments, features, and aspects of the invention will be described in detail below with reference to the drawings.

Figure 1:
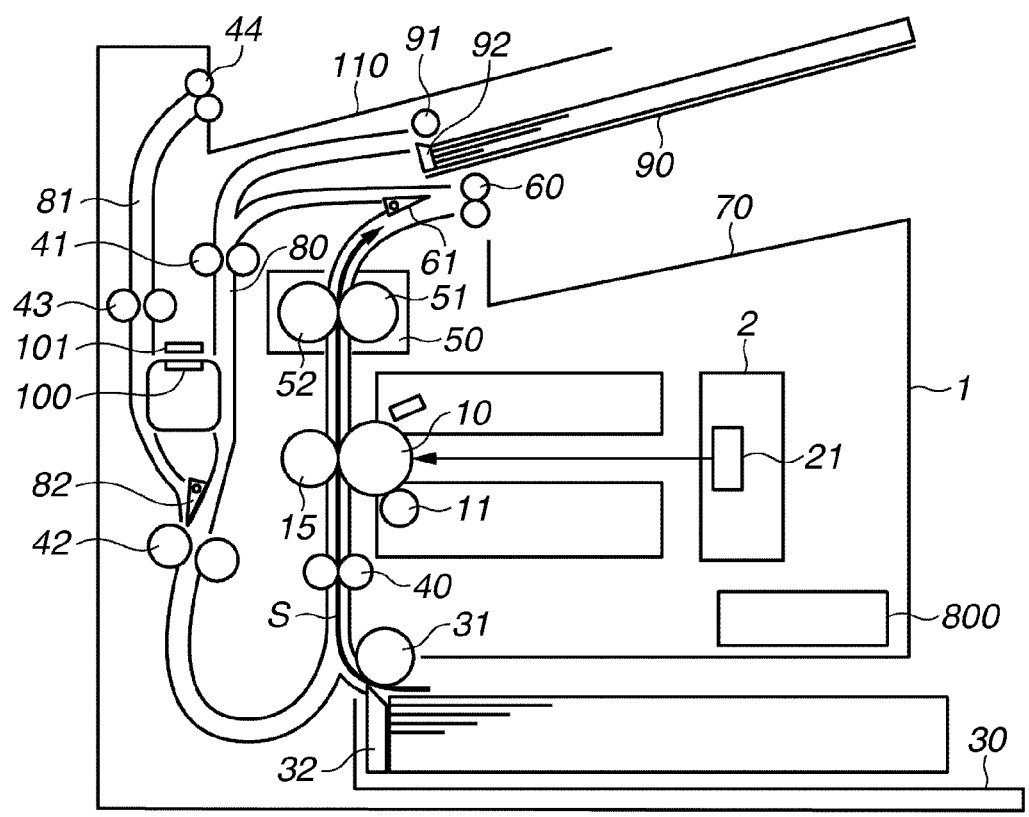
FIG. 1 illustrates a sectional view of an image processing apparatus 1 which is an example of a printing apparatus according to an exemplary embodiment of the present invention.

FIG. 1 illustrates a sectional view of an image processing apparatus 1 which is an example of a printing apparatus according to a first exemplary embodiment of the present invention. The image processing apparatus 1 includes a photosensitive drum 10 and a developing roller 11. The photosensitive drum 10 is a rotatable image bearing member. The developing roller 11 is in contact with the photosensitive drum 10 in parallel, and retains toner while rotating. When an optical unit 2 receives a printing signal, a light emitting unit 21 irradiates a surface of the rotating photosensitive drum 10 with laser light. A latent image composed of electrical charges is formed on the surface of the photosensitive drum 10 irradiated with the laser light. The rotating developing roller 11 supplies toner to the latent image formed on the surface of the photosensitive drum 10, so that a toner image is formed on the surface of the photosensitive drum 10.

A first sheet feeding unit 30 stores recording materials such as sheets and overhead projector (OHP) sheets. Recording materials S stored in the first sheet feeding unit 30 are conveyed to conveyance rollers 40 one by one by a cassette sheet tray (CST) pickup roller 31 and a separation unit 32. In FIG. 1, a thick arrow represents a recording material S and a traveling direction of the recording material S. The conveyance rollers 40 adjust timing so that the toner image on the surface of the photosensitive drum 10 and a leading edge of the recording material S are in time with each other, and convey the recording material S to a transfer unit 15.

The toner image is directed to the transfer unit 15 by the rotation of the photosensitive drum 10, and transferred to the recording material S by an applied bias and pressure applied to the transfer unit 15. The transfer unit 15 conveys the recording material S to a fixing unit 50. In the fixing unit 50, heat from a rotatable heating roller 51 and pressure from a pressure roller 52 fix the toner image to the recording material S. The recording material S to which the toner image is fixed is conveyed to sheet discharge rollers 60. For one-sided printing, the sheet discharge rollers 60 discharge the recording material S to outside the image processing apparatus 1. The recording material S is stacked on a first sheet discharge unit 70.

Figure 2:
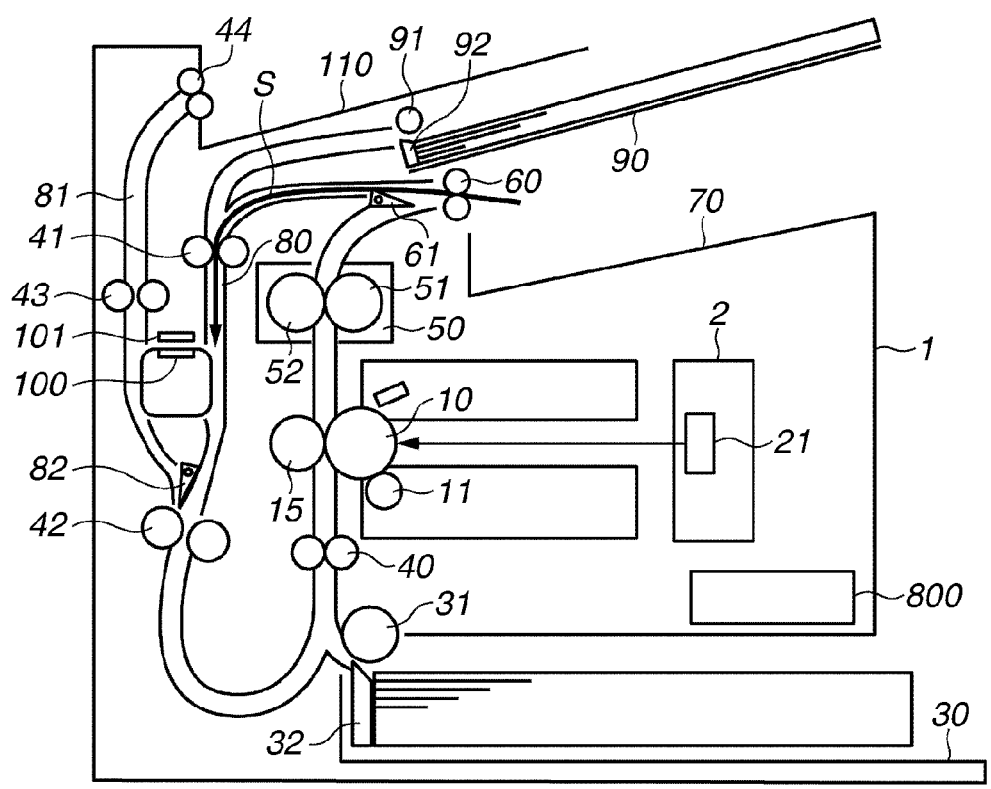
FIG. 2 illustrates a process for two-sided printing.

FIG. 2 illustrates a process for two-sided printing. After a trailing edge of the recording material S passes a two-sided flapper 61, the two-sided flapper 61 switches between conveyance paths. The sheet discharge rollers 60 then start reverse rotations to convey the recording material S to a two-sided conveyance path 80. Conveyance rollers 41 convey the recording material S to an image reading unit 100. The recording material S is then conveyed to the transfer unit 15 again by conveyance rollers 42 and the conveyance rollers 40. After a toner image is transferred and fixed to the recording material S, the two-sided printed recording material S is stacked on the first sheet discharge unit 70.

Figure 3:
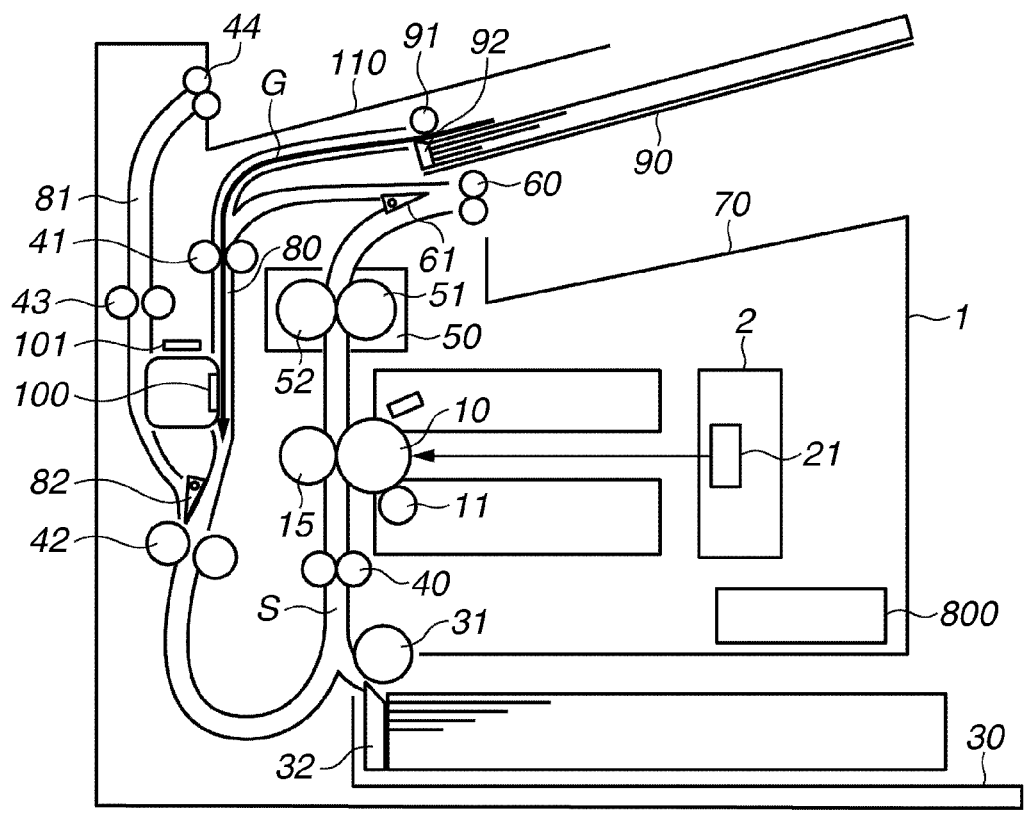
FIG. 3 illustrates reading of a first side of a document.

FIG. 3 illustrates reading of a first side of a document. In FIG. 3, a thick arrow represents a document G and a traveling direction of the document G. Documents G stored in a second sheet feeding unit 90 are conveyed to the conveyance rollers 41 one by one by a CIS pickup roller 91 and a separation unit 92. Before the image reading unit 100 starts to read a first side of a document G, a control central processing unit (CPU) 801 described below calculates shading correction coefficients. The shading correction coefficients are intended to correct variations in an output level of an image signal due to uneven sensitivity of the image reading unit 100, an uneven light source, an uneven amount of light, and the like. The control CPU 801 calculates the shading correction coefficients from a white reference image and a black reference image. The white reference image is obtained by a light emitting element 907 emitting light to a white reference member 101 when the image reading unit 100 is located in a position facing to the white reference member 101. The black reference image is read by the image reading unit 100 without the light emitting element 907 emitting light. The control CPU 801 sets the calculated shading correction coefficients as new shading correction coefficients.

The image reading unit 100 then rotates to a position facing to the two-sided conveyance path 80. The conveyance rollers 41 convey the document G to the image reading unit 100. The image reading unit 100 having waited at the position facing to the two-sided conveyance path 80 reads the first side of the document G. The image reading unit 100 stores the read information into an image memory 804 as image information about the first side of the document G. The image memory 804 will be described in details below with reference to FIG. 8. Note that the white reference member 101 is situated downward in consideration of dust adhesion. While the white reference member 101 is used as a reference member, the reference member may be other than white in color.

Figure 4:
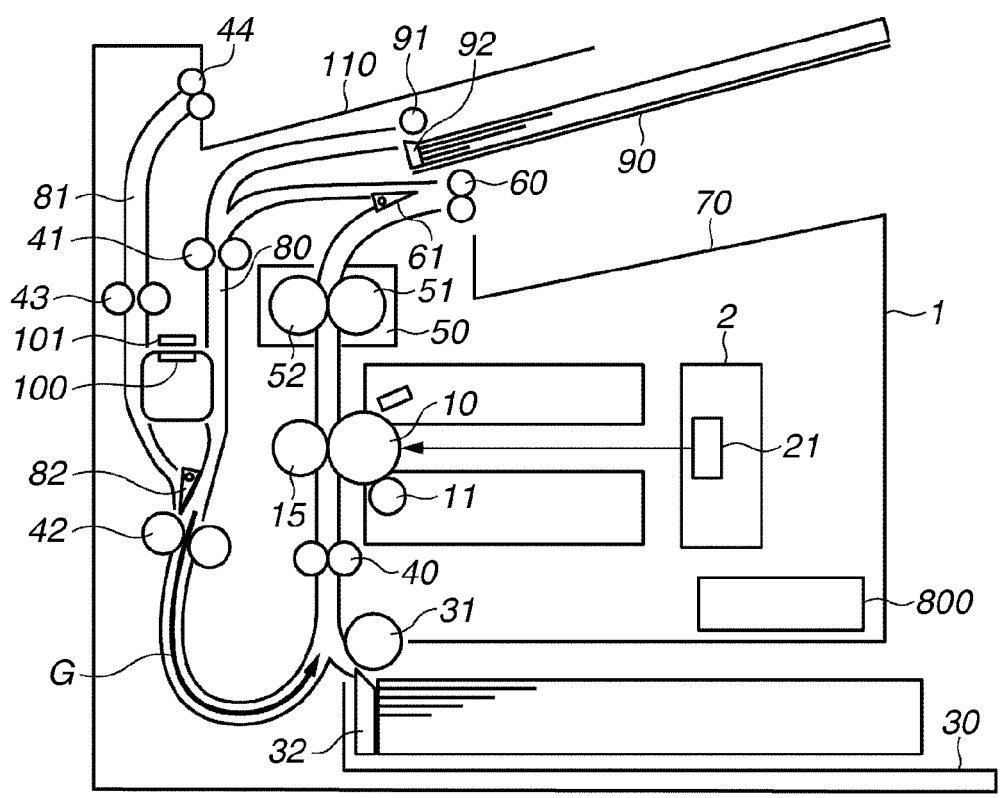
FIG. 4 illustrates a situation when the reading of the first side of the document ends.

FIG. 4 illustrates a situation when the reading of the first side of the document G ends. The document G past the image reading unit 100 is conveyed to the conveyance rollers 42. The conveyance rollers 42 stop when a trailing edge of the document G has passed a switchback flapper 82. Here, the document G is stopped with its trailing edge pinched between the conveyance rollers 42. After a lapse of a predetermined time, the conveyance rollers 42 convey the document G to a document conveyance path 81. During the predetermined time, the switchback flapper 82 switches a conveyance path from the two-sided conveyance path 80 to the document conveyance path 81.

After the reading of the first side of the document G ends, the image reading unit 100 rotates to the position facing to the white reference member 101. The position facing to the white reference member 101 is on a rotational orbit of the image reading unit 100. The control CPU 801 calculates shading correction coefficients from a white reference image which is obtained by the light emitting element 907 emitting light to the white reference member 101 when the image reading unit 100 is in the position facing to the white reference member 101 and a black reference image which is read by the image reading unit 100 without the light emitting element 907 emitting light. The control CPU 801 sets the calculated shading correction coefficients as new shading correction coefficients.

When the reading of the first side of the document G ends, the image reading unit 100 rotates to read a second side of the document G. The white reference member 101 is located on the way.

Figure 5:
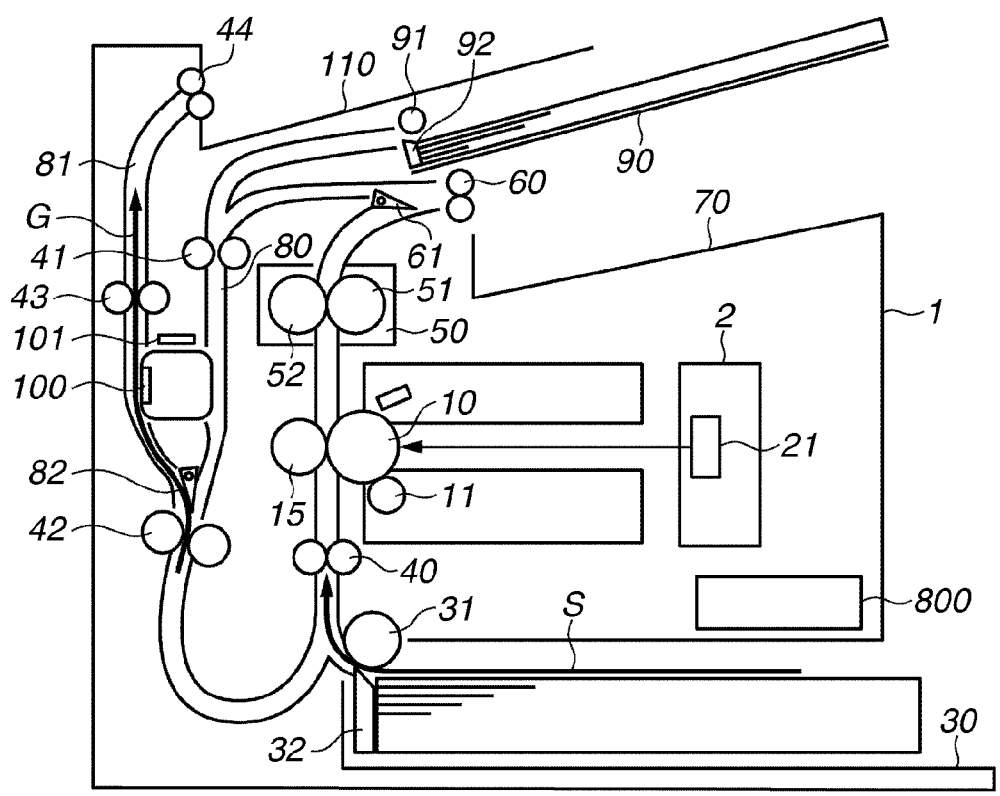
FIG. 5 illustrates reading of a second side of the document.

FIG. 5 illustrates the reading of the second side of the document G. At the same time when the switchback flapper 82 switches the conveyance path of the document G from the two-sided conveyance path 80 to the document conveyance path 81, the image reading unit 100 rotates to a position facing to the document conveyance path 81. The conveyance rollers 42 start reverse rotations to convey the document G to the image reading unit 100 through the document conveyance path 81. When the document G passes the image reading unit 100, the image reading unit 100 reads the second side of the document G. The image reading unit 100 stores the read image information into the image memory 804 as image information about the second side of the document G.

The recording materials S stored in the first sheet feeding unit 30 are conveyed to the conveyance rollers 40 one by one. Almost at the same time, the light emitting unit 21 irradiates the surface of the photosensitive drum 10 with the laser light based on the image information about the second side of the document G stored in the image memory 804, so that a latent image based on the image information about the second side of the document G is formed on the surface of the photosensitive drum 10. The transfer unit 15 transfers a toner image formed by the latent image to the recording material S. The fixing unit 50 fixes the toner image to the recording material S. Accordingly, image formation based on the image information about the second side of the document G is completed. In FIG. 5, the recording material S starts to be conveyed when the reading of the second side of the document G begins. However, the conveyance of the recording material S may be started after the second side of the document G has been read.

Figure 6:
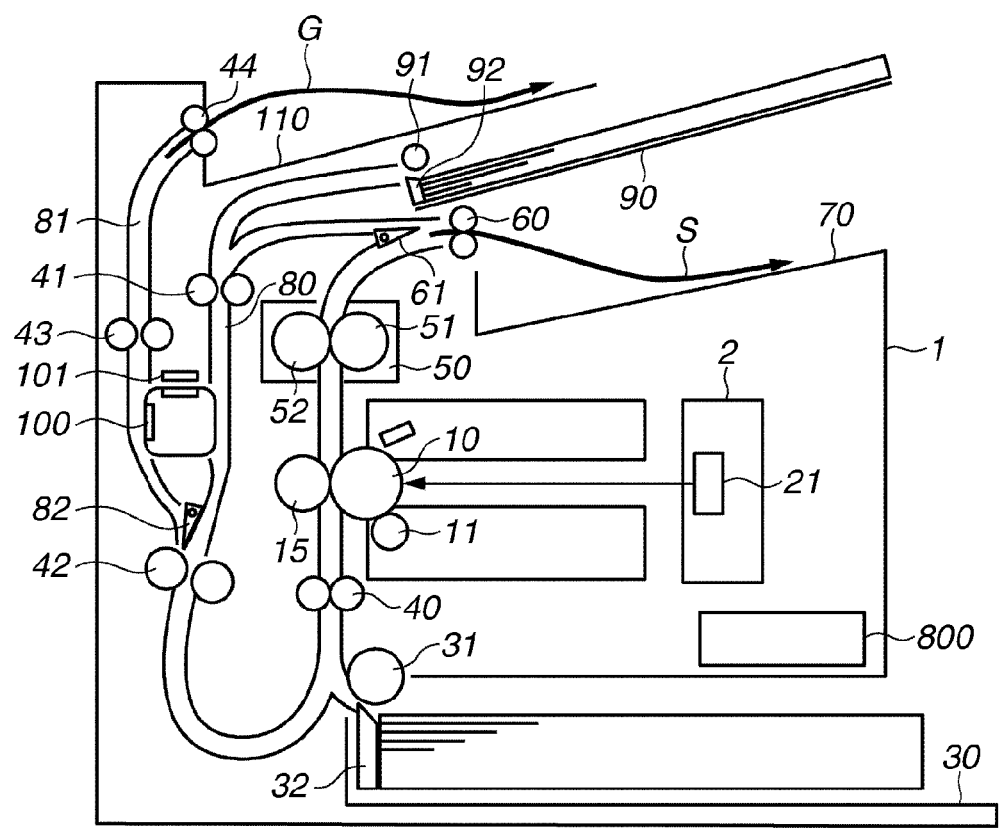
FIG. 6 illustrates a situation when the reading of the second side of the document ends.

FIG. 6 illustrates a situation when the reading of the second side of the document G ends. The document G is conveyed by conveyance rollers 43 and 44 to outside the image processing apparatus 1, and stacked on a second sheet discharge unit 110. When a trailing edge of the document G passes the switchback flapper 82, the switchback flapper 82 switches the conveyance path from the document conveyance path 81 to the two-sided conveyance path 80 so that the recording material S is conveyed to the conveyance rollers 40. The sheet discharge rollers 60 then rotate reversely to convey the recording material S on which the image formation of the second side of the document G has been completed, to the two-sided conveyance path 80 switched by the two-sided flapper 61.

Figure 7:
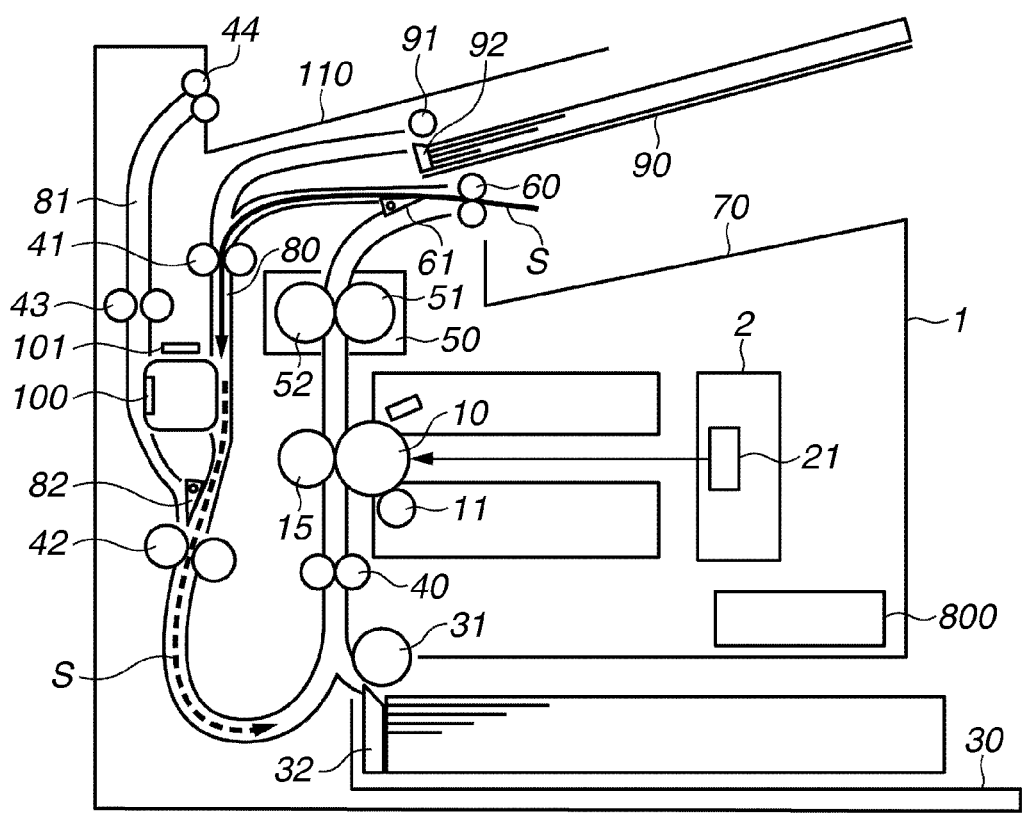
FIG. 7 illustrates image formation based on image information about the first side of the document.

FIG. 7 illustrates image formation based on the image information about the first side of the document G. After the trailing edge of the recording material S passes the two-sided flapper 61, the two-sided flapper 61 switches the conveyance path. The, the sheet discharge rollers 60 start reverse rotations to convey the recording material S to the two-sided conveyance path 80. The recording material S conveyed to the two-sided conveyance path 80 passes the image reading unit 100. The conveyance rollers 42 convey the recording material S to the conveyance rollers 40, and the conveyance rollers 40 convey the recording material S to the transfer unit 15. In FIG. 7, a dotted arrow indicates how the recording material S is conveyed. The light emitting unit 21 irradiates the surface of the photosensitive drum 10 with the laser light based on the image information about the first side of the document G stored in the image memory 804, so that a latent image based on the image information about the first side of the document G is formed on the surface of the photosensitive drum 10. The transfer unit 15 transfers a toner image formed by the latent image to the recording material S. The fixing unit 50 fixes the toner image to the recording material S. Accordingly, the image formation based on the image information about the first side of the document G is completed. The recording material S is then stacked on the first sheet discharge unit 70.

The printing-related units including the photosensitive drum 10, the developing roller 11, the transfer unit 15, and the fixing unit 50 will be hereinbelow referred to collectively as a printing unit.

Figure 8:
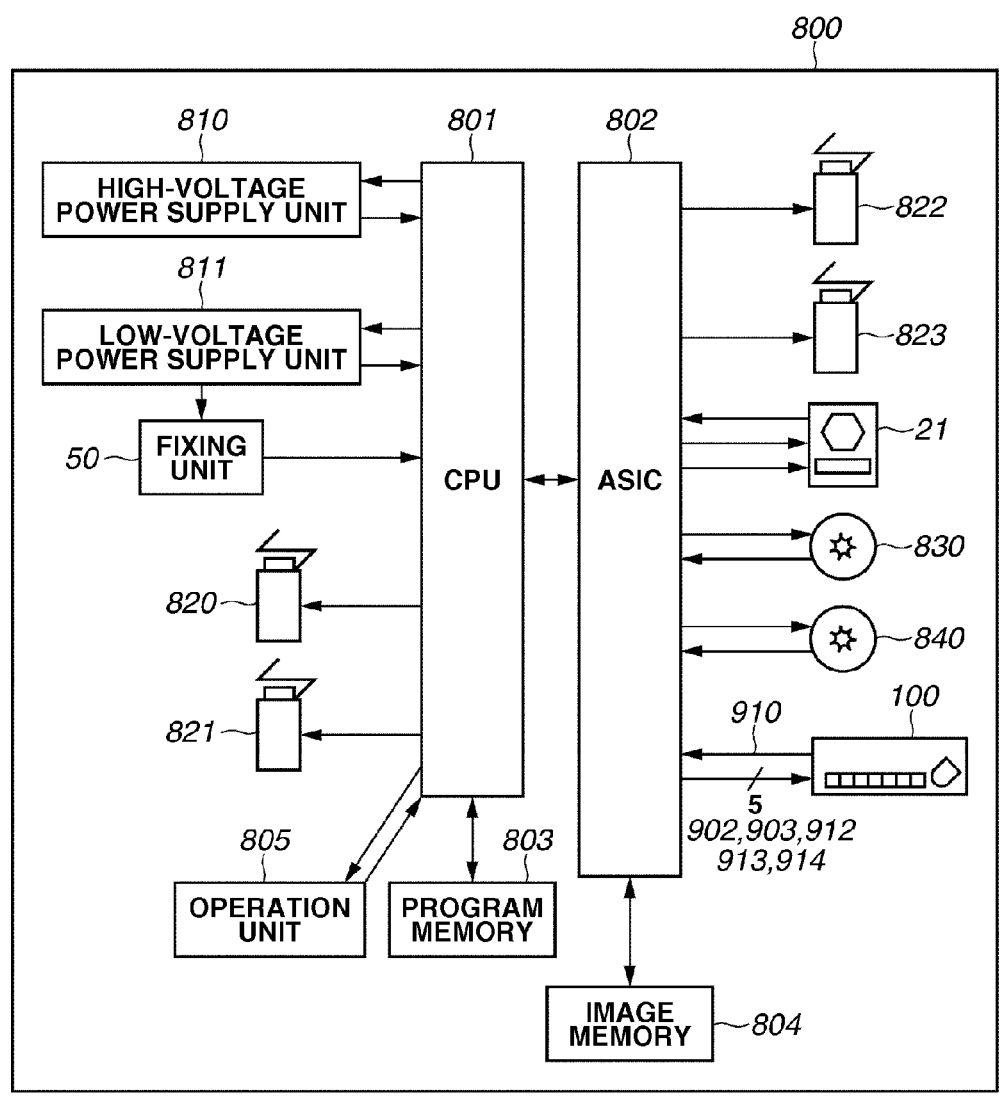
FIG. 8 is a block diagram illustrating electrical equipment of the image processing apparatus 1.

FIG. 8 illustrates hardware of the image processing apparatus 1. Electrical equipment 800 of the image processing apparatus 1 will be described with reference to FIG. 8. FIG. 8 illustrates units to be controlled by the control CPU 801 (hereinbelow, referred to as CPU 801).

The CPU 801 is connected to the light emitting unit 21 via an application specific integrated circuit (ASIC) 802. The light emitting unit 21 includes a polygonal mirror, a motor, a laser light emitting element, and so on. To scan the surface of the photosensitive drum 10 with laser light to form a desired latent image, the CPU 801 transmits a control signal to the ASIC 802 to control the light emitting unit 21. To convey a recording material S, the CPU 801 transmits a control signal to the ASIC 802 to control a driving system including a main motor 830, a two-sided drive motor 840, a CST sheet feeding solenoid 822, a CIS sheet feeding solenoid 823, and the like. The main motor 830 drives the CST pickup roller 31, the conveyance rollers 40, the photosensitive drum 10, the transfer unit 15, the heating roller 51, the pressure roller 52, and the like. The CST sheet feeding solenoid 822 is turned on to drive the CST pickup roller 31 when sheet feeding rollers for feeding the recording material S starts to drive. The two-sided drive motor 840 drives the CIS pickup roller 91 and the conveyance rollers 41 to 44.

The CPU 801 controls a high-voltage power supply unit 810 and a low-voltage power supply unit 811. The high-voltage power supply unit 810 controls charging, development, and transfer which are needed for an electrophotographic process. The low-voltage power supply unit 811 controls fixing. The CPU 801 further monitors temperature by a thermistor (not illustrated) included in the fixing unit 50, and performs control to maintain a constant fixing temperature.

The CPU 801 is connected to a program memory 803 via a bus or the like. The program memory 803 stores programs and data pieces for executing all or part of processing to be performed by the CPU 801. In other words, the CPU 801 performs processing to be described below using the programs and data pieces stored in the program memory 803.

The ASIC 802 performs speed control of the motor inside the light emitting unit 21, speed control of the main motor 830, and speed control of the two-sided drive motor 840 based on instructions from the CPU 801. The speed control of a motor includes detecting a tachometer (tach) signal from the motor and transmitting an acceleration signal or a deceleration signal to the motor so that the tach signal occurs at predetermined time intervals. The tach signal refers to a pulse signal output from the motor each time the motor makes a rotation. The use of the ASIC 802 advantageously reduces a control load of the CPU 801.

The CPU 801 is connected to an operation unit 805. The operation unit 805 includes a display unit such as a touch panel, and operation keys. The CPU 801 controls the operation unit 805 to display an operation screen, and receives user instructions via the operation unit 805.

Figure 21:
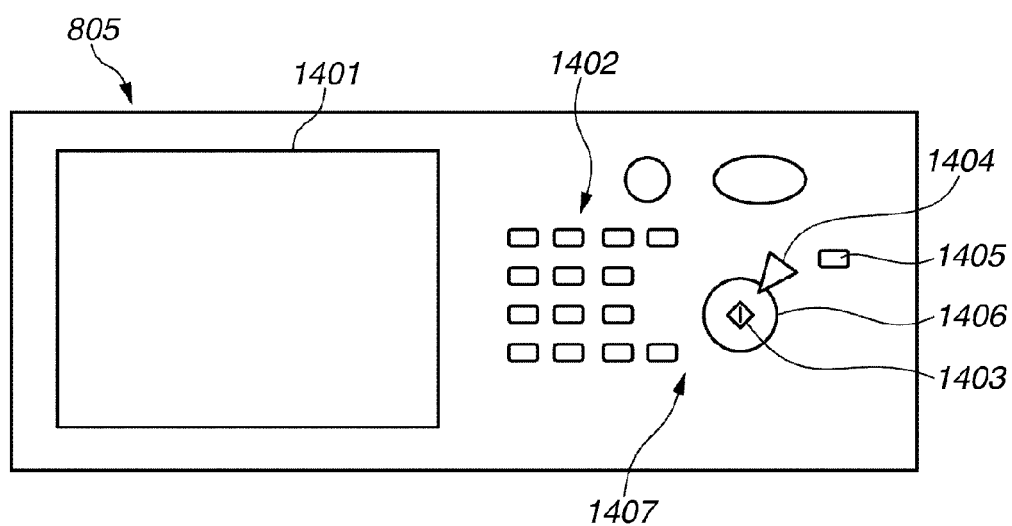
FIG. 21 illustrates an example of an operation unit according to the present exemplary embodiment.

FIG. 21 illustrates an example of the operation unit 805. A display unit 1401 includes a liquid crystal display to which a touch panel sheet is pasted. The display unit 1401 displays an operation screen and software keys. When a user presses a software key, the display unit 1401 transmits position information indicating the pressed position to the CPU 801. The CPU 801 determines an instruction from the user based on the position information.

A keyboard 1407 includes a numeric keypad 1402, a stop key 104, a user mode key 1405, and a start key 1406. The numeric keypad 1402 includes keys for inputting numerals and characters. The numeric keypad 1402 is used to set the number of copies and to switch screens. The stop key 1404 is a key for stopping an operation in process. The user mode key 1405 is a key for setting the image processing apparatus 1. The start key 1406 is a key for giving an instruction to start image reading or start printing.

A two-color light-emitting diode (LED) 1403 is arranged in the center of the start key 1406. When the two-color LED 1403 is green, it indicates that the start key 1406 is usable. When the two-color LED 1403 is red, it indicates that the start key 1406 is not usable.

When the CPU 801 receives a copy instruction from the operation unit 805 or a print command from a host computer, the CPU 801 drives the main motor 830 and the two-sided drive motor 840 to convey a recording material S. After the transfer unit 15 transfers a toner image formed on the surface of the photosensitive drum 10 to the recording material S and the fixing unit 50 fixes the toner image to the recording material S, the recording material S is discharged to the first sheet discharge unit 70. To better align image-formed recording materials S, the first sheet discharge unit 70 has a gentle rising slope from near a sheet discharge port in a discharge direction of the recording materials S. The CPU 801 controls the low-voltage power supply unit 811 to supply predetermined power to the fixing unit 50. The fixing unit 50 generates a predetermined amount of heat, and gives the amount of heat to the recording material S to fuse the toner image on the recording material S, thereby fixing the toner image to the recording material S.

When the CPU 801 receives a scan instruction from the operation unit 805 or a scan command from the host computer, the CPU 801 drives the two-sided drive motor 804. Torque of the two-sided drive motor 804 is transmitted to the CIS pickup roller 91, and thus the CIS pickup roller 91 conveys a document G. The image reading unit 100 is connected to the ASIC 802 via signal lines 902, 903, 910, 912, 913, and 914. According to an instruction from the CPU 801, the ASIC 802 controls the image reading unit 100 to store image information read by the image reading unit 100 into the image memory 804.

Figure 9:
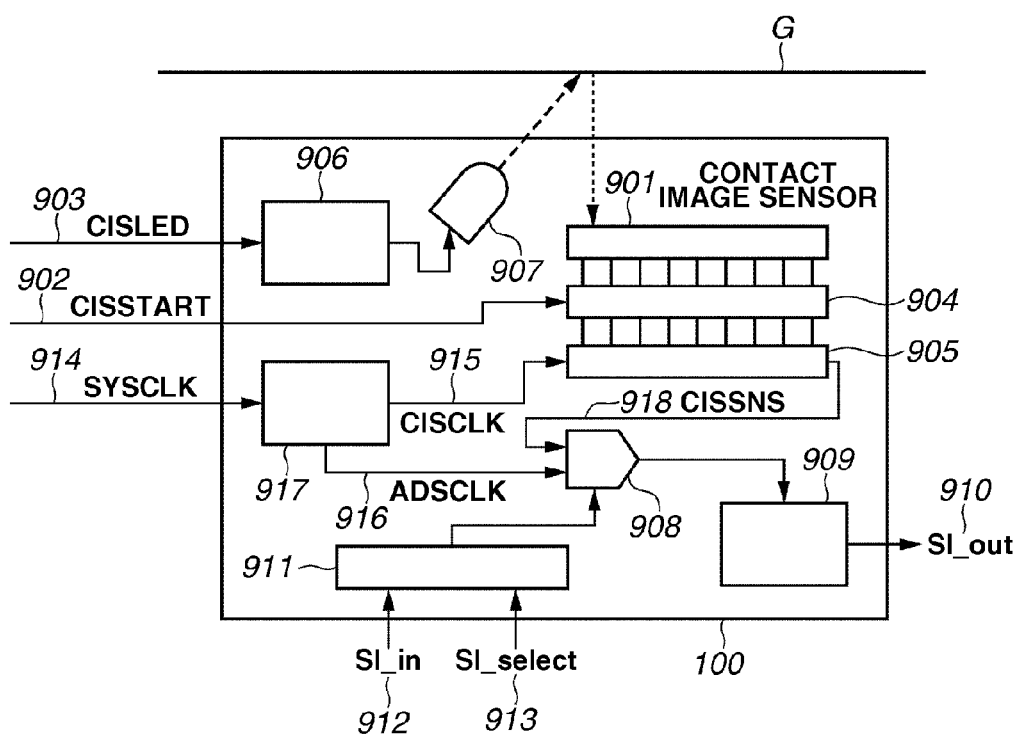
FIG. 9 illustrates details of an image reading unit.

FIG. 9 illustrates details of the image reading unit 100. FIG. 9 illustrates contact image sensor (CIS) circuit blocks. A contact image sensor (CIS) 901 includes, for example, 10368 pixels of photodiodes which are arranged in an array at a specific main scanning density (for example, 1200 dpi).

The image reading unit 100 receives a start pulse signal (CISSTART) 902, a light emitting element control signal (CISLED) 903, an Sl_in signal 912, an Sl_select signal 913, and a system clock (SYSCLK) 914 which determines an operation speed of the CIS 901. The image reading unit 100 transmits an Sl_out signal 910.

The light emitting element 907 emits light based on a current amplified by a current amplification unit 906 to uniformly irradiate the document G.

When the CISSTART signal 902 becomes active, the contact image sensor 901 starts to accumulate charges based on the received light, and sequentially sets data into an output buffer 904. When a transfer clock (CISCLK) 915 (for example, 500 kHz to 1 MHz) is supplied to a shift register 905, the shift register 905 transfers the data set in the output buffer 904 to an analog-to-digital (A/D) converter 908 as a CISSNS signal 918.

The CISSNS signal 918 includes a predetermined data guarantee section. The A/D converter 908 thus samples the CISSNS signal 918 after a lapse of a predetermined time since rising timing of the transfer clock 915. The CISSNS signal 918 is output in synchronization with both rising and falling edges of the transfer clock 915. The sampling rate of the A/D converter 908 is determined by a CIS sampling clock (AD-CLK) 916. The CIS sampling clock 916 is generated with a frequency twice that of the transfer clock 915. The CISSNS signal 918 is sampled at rising edges of the CIS sampling clock 916. A timing generator 917 divides the frequency of the system clock 914 to generate the CIS sampling clock 916 and the transfer clock 915. The CIS sampling clock 916 lags behind the transfer clock 915 in phase as much as the data guarantee section.

An output interface circuit 909 outputs the CISSNS signal 918 digitally converted by the A/D converter 908 as the Sl_out signal 910 at a predetermined timing. The Sl_out signal 910 is serial data. The CISSNS signal 918 as much as a predetermined number of pixels from the CISSTART signal 902 is an analog output reference voltage which is not used as effective pixels.

A control circuit 911 can variably control an A/D conversion gain of the A/D converter 908 according to the Sl_in signal 912 and the Sl_select signal 913. For example, if a captured image does not have appropriate contrast, the CPU 801 instructs the control circuit 911 to increase the A/D conversion gain of the A/D converter 908 for higher contrast. Images can thus be captured with optimum contrast.

FIG. 9 illustrates an example where all the pixels are output as the CISSNS signal 918 one by one. However, in order to read an image at high speed, a plurality of pixels may be divided into areas, and A/D conversion may be performed on a plurality of areas in parallel. In FIG. 9, the image reading unit 100 uses a CIS. However, the image reading unit 100 may use a complementary metal oxide semiconductor (CMOS) sensor or a charge-coupled device (CCD) sensor.

Figure 10:
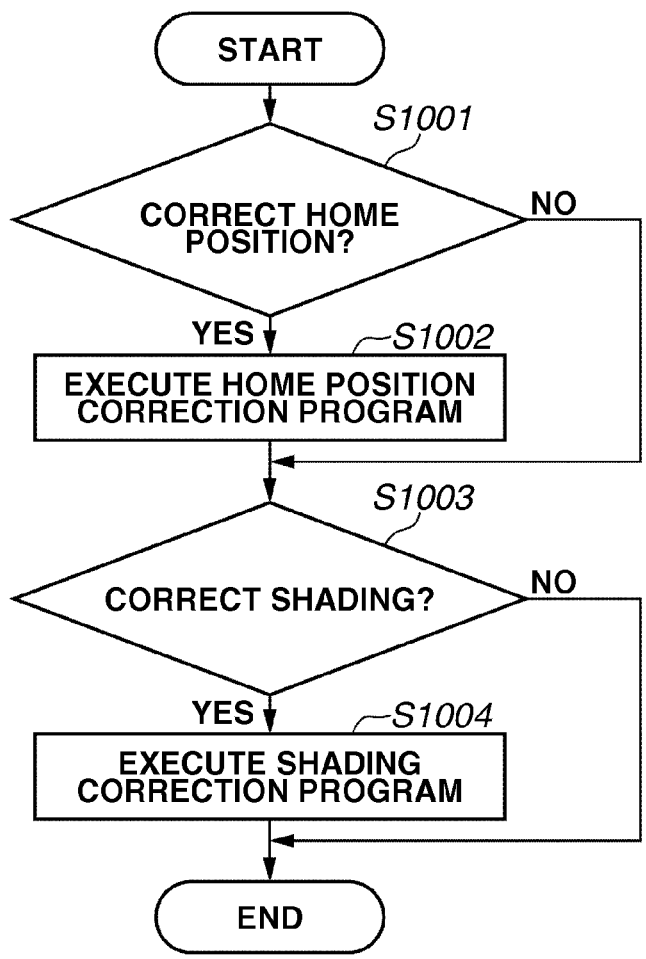
FIG. 10 is a flowchart illustrating a flow of entire processing according to an exemplary embodiment.

FIG. 10 is a flowchart illustrating shading correction processing to be performed by the image processing apparatus 1. According to the present exemplary embodiment, the CPU 801 executes a control program based on the flowchart to perform the following correction processing.

In step S1001, the CPU 801 determines whether the image reading unit 100 is to correct a reference position (home position). When the image reading unit 100 reads the white reference member 101 to determine shading correction coefficients, the image reading unit 100 is in the position facing to the white reference member 101 (positions of the image reading unit 100 and the white reference member 101 in FIG. 2). The image reading unit 100 ideally is in the position facing to the white reference member 101 (FIG. 12B) immediately before the determination of the shading correction coefficients. However, the reference position of the image reading unit 100 may deviate due to aged deterioration of the image reading unit 100 or external vibrations. If the reference position of the image reading unit 100 deviates, the deviated position is regarded as a reference position and correction coefficients at respective rotation angles illustrated in FIG. 16 are applied to deviated angles different from ones to which the correction coefficients are supposed to be applied. For example, if the reference position of the image reading unit 100 has a deviation of 2 degrees due to aged deterioration, the correction coefficient of 1.000 (correction coefficient at a rotation angle of 0 degrees) is applied to data read in a 2 degrees deviated position.

In view of such an issue, the reference position of the image reading unit 100 needs to be corrected to the position of 0 degrees in the rotation angle.

After installation of the image processing apparatus 1, after a lapse of a predetermined time since the end of previous printing, immediately before execution of a scan job, or at a timing immediately before the image reading apparatus 100 reads a document G, the CPU 801 determines in step S1001 that the reference position needs to be corrected (YES in step S1001), and advances the processing to step S1002.

In step S1001, if the home position is determined to be corrected (YES in step S1001), then in step S1002, the CPU 801 executes a program for correcting the home position of the image reading unit 100. The program for correcting the home position will be described in detail below with reference to FIG. 11. In step S1003, the CPU 801 determines whether to perform shading correction on a document G to be read. The shading correction is intended to capture an image of uniform brightness in the presence of luminance variations due to characteristics of a light source of the image reading unit 100 and the CIS 901. The processing in step S1003 is performed immediately before execution of a scan job, immediately before the image reading unit 100 reads a document G, at a timing when the CPU 801 receives information from various temperature sensors arranged inside the image processing apparatus 1, or when a predetermined number of sheets has been printed. In step S1003, if the shading correction is determined to be performed (YES in step S1003), then in step S1004, the CPU 801 executes a shading correction program on the CIS 901 of the image reading unit 100. The shading correction program will be described in detail below with reference to FIG. 15. The timing of the correction of the home position in step S1002 may be after the execution of the shading correction program in step S1004.

Now, the program for correcting the home position of the image reading processing 100, executed in step S1002 in FIG. 10, will be described with reference to a flowchart in FIG. 11 and FIGS. 12A to 12G, 14A, and 14B. FIG. 12C illustrates an example where the home position of the image reading unit 100 deviates by θ=2 degrees (an angle 1202 in FIG. 12C) clockwise. The rotation angle θ is positive (+) when the image reading unit 100 tilts clockwise (the state in FIG. 12C) from an ideal state where the image reading unit 100 has no tilt (FIG. 12B). The rotation angle θ is negative (−) when the image reading unit 100 tilts counterclockwise (the state in FIG. 12A).

In step S1101, the CPU 801 transmits a control signal to the ASIC 802 to control the two-sided drive motor 840 so that the image reading unit 100 rotates by 15 degrees counterclockwise from the position that is assumed to be the current home position (FIG. 12C). In step S1102, the CPU 801 controls the light emitting element 907 to emit light.

Figure 12A:
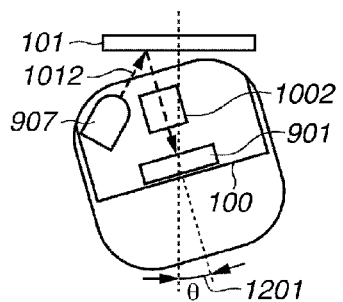
FIGS. 12A to 12G illustrate states where the image reading unit is rotated and a configuration of the image reading unit.
Figure 12B:
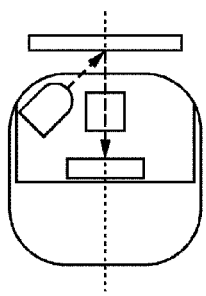
Figure 12C:
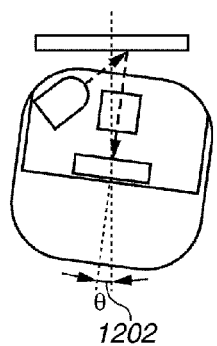
Figure 12D:
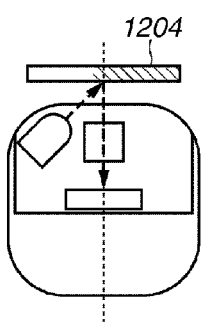
Figure 12E:
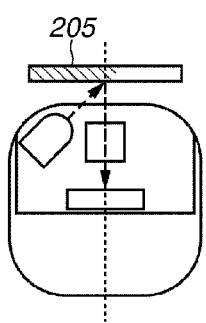
Figure 12F:
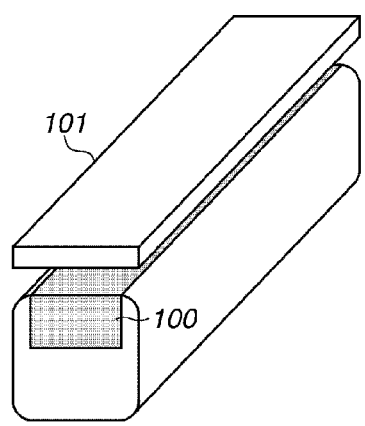
Figure 12G:
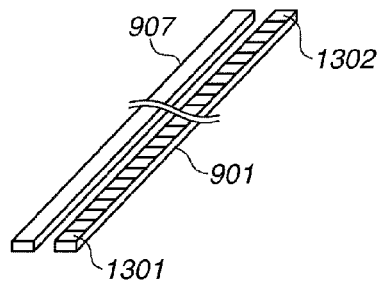

In step S1103, with the light emitting element 907 emitting light, the CPU 801 reads all data values of the CIS 901 in the image reading unit 100 as much as the main scanning density (10368 pixels). FIG. 12G illustrates the CIS 901 and the light emitting element 907 included in the image reading unit 100 illustrated in FIG. 12F. Sensor pixels No. 0 (a pixel 1301 in FIG. 12G) to No. 10367 (a pixel 1302 in FIG. 12G) illustrated in FIG. 12G correspond to the main scanning density of the CIS 901. It will be understood that while the number of main scanning pixels in the present exemplary embodiment is 10368, the pixels may be different in number.

In step S1104, the CPU 801 performs averaging processing on the amounts of received light for one line (L(i): i=0 to 10367) read in step S1103 by using the following equation (1). The CPU 801 stores the average amount of received light into the image memory 804 along with the rotation angle θ at the time of reading. FIG. 14A illustrates the amounts of received light at respective rotation angles θ.
Equation (1)

$$\text{Amounts of received light} = (\Sigma_{i=0}^{10369} L(i))/10368 \quad (1)$$

As employed herein, the amount of received light refers to luminance. The amount of received light may refer to L in an L*a*b* space, Y in a YUV system, or other units that express luminance.

In step S1105, the CPU 801 transmits a control signal to the ASIC 802 to control the two-sided drive motor 840 so that the image reading unit 100 rotates by 1 degree clockwise.

In step S1106, the CPU 801 determines whether the rotation angle θ of the image reading unit 100 is greater than or equal to 16 degrees clockwise (+16 degrees). The CPU 801 repeats the processing in steps S1102 to S1105 until the rotation angle θ of the image reading unit 100 varies from −15 degrees to +15 degrees. In step S1106, if the rotation angle θ is determined to be greater than or equal to 16 degrees clockwise (YES in step S1106), the CPU 801 advances the processing to step S1107.

In step S1107, the CPU 801 extracts a rotation angle θ at which the amount of received light becomes maximum among the amounts of received light at the respective rotation angles θ from −15 degrees to +15 degrees, from the data group stored in the image memory 804. FIG. 14B illustrates the amounts of received light (luminance information) at the respective rotation angles θ, obtained in steps S1101 to S1106. In FIG. 14B, the maximum value of the amounts of received light is 210 (item 1403 in FIG. 14B), and the rotation angle θ of the image reading unit 100 at which the amount of received light becomes maximum is −2 degrees (item 1404 in FIG. 14B). This means that the current position of the image reading unit 100 deviates by 2 degrees clockwise as illustrated in FIG. 12C.

In step S1108, the CPU 801 transmits a control signal to the ASIC 802 to control the two-sided drive motor 840 so that the image reading unit 100 rotates by 2 degrees counterclockwise from the current position. The direction of rotation of the image reading unit 100 is such that the image reading unit 110 approaches the white reference member 101. Then, the CPU 801 re-sets the position after the rotation as a new home position. That is the flow of the program for correcting the home position (reference position) of the image reading unit 100.

Next, the shading correction program executed on the CIS 901 in the image reading unit 100 in step S1004 in FIG. 10 will be described in detail with reference to a flowchart in FIG. 15 and FIGS. 16 to 21.

In step S1501, the CPU 801 determines whether to generate shading correction coefficients for reading a front side, or first side, of the document G, or generate shading correction coefficients for reading a back side, or second side, of the document G.

Before the image reading unit 100 rotates to the position facing to the two-sided conveyance path 80 to start reading the first side of the document G as illustrated in FIG. 3, the image reading unit 100 is in the position facing to the white reference member 101. The light emitting element 907 emits light, and the CIS 901 receives light reflected from the white reference member 101 to generate shading correction coefficients for reading the front side, or first side, of the document G. FIG. 2 illustrates the position where the image reading unit 100 faces to the white reference member 101.

Before the image reading unit 100 rotates to the position facing to the document conveyance path 81 to start reading the second side of the document G as illustrated in FIG. 5, the image reading unit 100 is in the position facing to the white reference member 101. The light emitting element 907 emits light, and the CIS 901 receives light reflected from the white reference member 101 to generate shading correction coefficients for reading the back side, or second side, of the document G.

In step S1501, if shading correction coefficients for reading the front side are determined to be generated (YES in step S1501), the CPU 801 advances the processing to step S1502. If shading correction coefficients for reading the back side are determined to be generated (NO in step S1501), the CPU 801 advances the processing to step S1503.

In step S1502, the CPU 801 sets −5 degrees into a parameter StartDeg serving as an initial rotation angle of the image reading unit 100, and +25 degrees into a parameter StopDeg serving as a measurement stop rotation angle of the image reading unit 100. The rotation angle θ is positive (+) when the image reading unit 100 tilts clockwise (the state in FIG. 12C)

from an ideal state where the image reading unit 100 has no tilt (FIG. 12B). The rotation angle θ is negative (−) when the image reading unit 100 tilts counterclockwise (the state in FIG. 12A). The reason for setting the rotation angle θ of the image reading unit 100 to the range of −5 degrees to +25 degrees in the calculation of the shading correction coefficients for reading the first side (front side) of the document G will be described below.

As illustrated in FIG. 3, the image reading unit 100 rotates to the position facing to the two-sided conveyance path 80 (first conveyance path) to read the first side of the document G. When shading correction is performed on data read from the first side of the document G, the write reference member 101 is ideally located near the position facing to the two-sided conveyance path 80. The reason is that the accuracy of the shading correction deteriorates if the shading correction coefficients are calculated in an environment having a temperature and/or humidity different from those of the reading position of the image reading unit 100.

For example, the light reception sensitivity of the CIS 901 varies and the dynamic range of the light received by the CIS 901 changes with the temperature of the environment where the light is received. More specifically, as the temperature when the CIS 901 receives light increases, the voltage of dark potions increases. This increases black reference correction values and narrows the dynamic range. The shading correction coefficients are therefore better calculated at a temperature same as that of the reading position of the image reading unit 110. In the image processing apparatus 1 according to the present exemplary embodiment, the heating roller 51 of the fixing unit 50 is located near the two-sided conveyance path 80. Thus, the temperature of the position facing to the two-sided conveyance path 80 is higher than that of the document conveyance path 81. To read the white reference member 101 at the same temperature as that of the position facing to the two-sided conveyance path 80, the light emitting element 907 thus emits light to the white reference member 101 only in a position closer to the two-sided conveyance path 80 (a position 1204 in FIG. 12D).

In step S1503, the CPU 801 sets −25 degrees into the parameter StartDeg serving as the initial rotation angle of the image reading unit 100, and +5 degrees into the parameter StopDeg serving as the measurement stop rotation angle of the image reading unit 100. The reason for setting the rotation angle θ of the image reading unit 100 to the range of −25 degrees to +5 degrees in the calculation of the shading correction coefficients for reading the second side (back side) of the document G will be described below.

As illustrated in FIG. 5, the image reading unit 100 rotates to the position facing to the document conveyance path 81 (second conveyance path) to read the second side of the document G. As described above, the accuracy of the shading correction deteriorates if the shading correction coefficients are calculated in an environment having a temperature and/or humidity different from those of the reading position of the image reading unit 100. The light emitting element 907 thus emits light to the white reference member 101 in positions closer to the document conveyance path 81. For example, in the calculation of the shading correction coefficients for reading the second side (back side) of the document G, as illustrated in FIG. 12E, the light emitting element 907 may emit light to only the left position (1205) of the white reference member 101.

In step S1504, the CPU 801 transmits a control signal to the ASIC 802 to control the two-sided drive motor 840 so that the image reading unit 100 rotates from the current home position to the rotation angle θ that is set in the parameter StartDeg. In step S1505, the CPU 801 controls the light emitting element 907 of the image reading unit 100 to stop emitting light if a light emission instruction has been given.

In step S1506, the CPU 801 causes the image reading unit 100 to read the write reference member 101 to acquire luminance information with the light emitting element 907 not emitting light. The CPU 801 stores the acquired luminance information as black reference data for shading correction into a black reference data storage area of the image memory 804. The CPU 801 stores the black reference data into the image memory 804 along with the rotation angle θ of the image reading unit 101 at the time of reading. FIG. 17B illustrates a black reference data group obtained in step S1506 during calculation of the shading correction coefficients for reading the first side (front side) of the document G. FIG. 17A illustrates a black reference data group obtained in step S1506 during calculation of the shading correction coefficients for reading the second side (back side) of the document G. FIGS. 17A and 17B illustrate luminance values that each pixel of the CIS 901 read from the white reference member 101 at respective rotation angles θ of the image reading unit 100.

In step S1507, the CPU 801 issues a light emission instruction to the light emitting element 907 of the image reading unit 100.

Figure 18A:
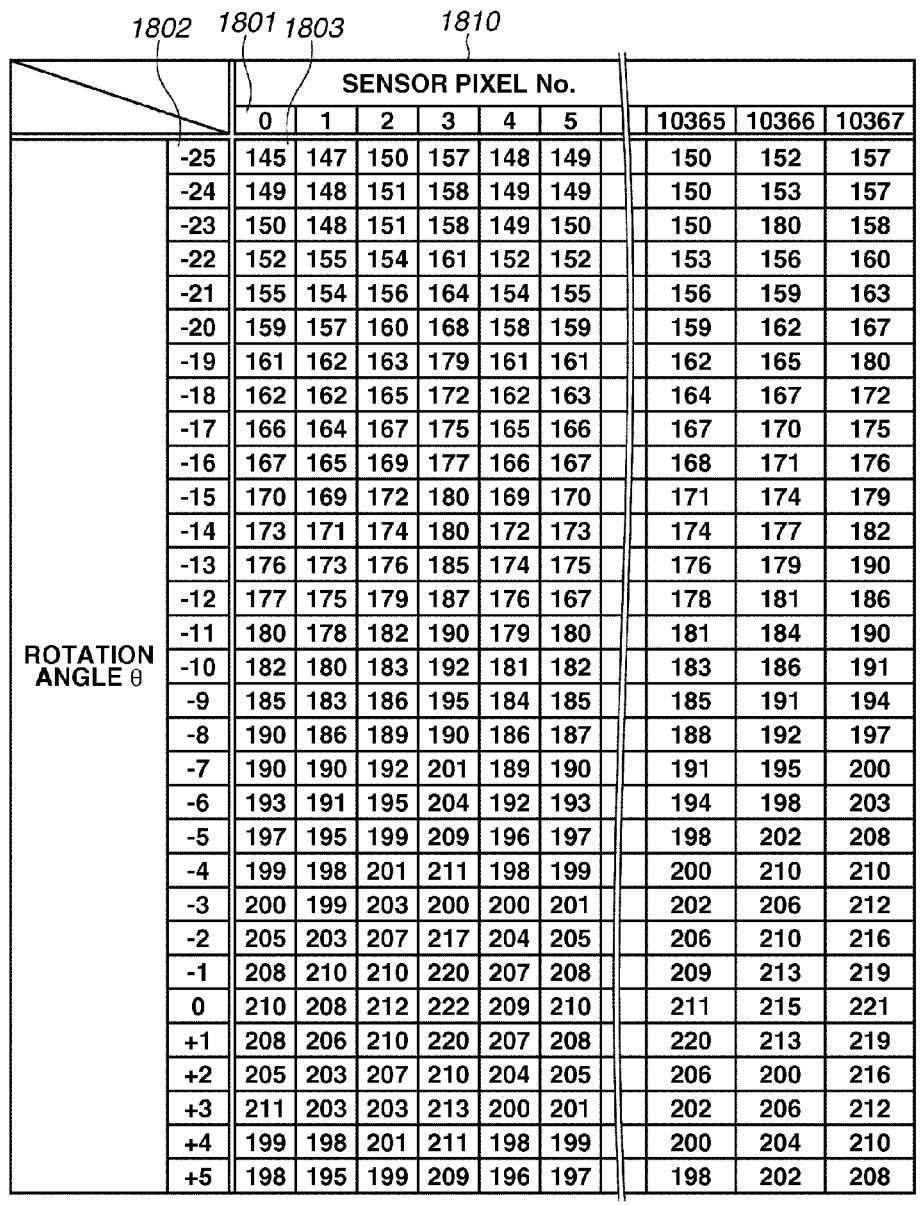

In step S1508, the CPU 801 causes the image reading unit 100 to read the white reference member 101 to acquire luminance information with the light emitting element 907 emitting light. The CPU 801 stores the acquired luminance information as white reference data for shading correction into a white reference data storage area of the image memory 804. The CPU 801 stores the white reference data into the image memory 804 along with the rotation angle θ of the image reading unit 100 at the time of reading. FIG. 18B illustrates a white reference data group obtained in step S1508 during calculation of the shading correction coefficients for reading the first side (front side) of the document G. FIG. 18A illustrates a white reference data group obtained in step S1508 during calculation of the shading correction coefficients for reading the second side (back side) of the document G. FIGS. 18A and 18B illustrate luminance values that each pixel of the CIS 901 read from the write reference member 101 at respective rotation angles θ of the image reading unit 100.

In step S1509, the CPU 801 transmits a control signal to the ASIC 802 to control the two-sided drive motor 804 so that the image reading unit 101 rotates by 1 degree clockwise from the current position. In step S1509, the image reading unit 100 is rotated in units of 1 degree. However, the image reading unit 100 may be rotated in any predetermined units of angles such as 2 degrees and 4 degrees.

In step S1510, the CPU 801 determines whether the rotation angle θ of the image reading unit 100 has reached the measurement stop rotation angle set in the parameter StopDeg. If not (NO in step S1510), the CPU 801 advances the processing to step S1505. If the rotation angle θ of the image reading unit 100 is determined to have reached the measurement stop rotation angle set in the parameter StopDeg (YES in step S1510), the CPU 801 advances the processing to step S1511.

In step S1511, the CPU 801 corrects the write reference data group (FIGS. 18A and 18B) by multiplying the white reference data group obtained in step S1508 by correction coefficients determined for respective rotation angles θ. The white reference data group in FIG. 18A is corrected to obtain data in FIG. 19A. The white reference data group in FIG. 18B is corrected to obtain data in FIG. 19B.

FIG. 16 illustrates the relationship between the rotation angles θ and the correction coefficients. The reason why the correction coefficient increases as the rotation angle θ increases (or decreases) in FIG. 16 will be described below. As the rotation angle θ of the image reading unit 100 gets away from 0 degrees, the distance over which the light emitted from the light emitting element 907 is reflected from the white reference member 101 to reach the CIS 901 increases. This reduces the amount of reflected light with respect to the light emitted from the light emission element 907. More specifically, when the rotation angle θ of the image reading unit 100 is −25 degrees, the information read by the sensor pixel No. 0 (item 1803 in FIG. 18A) is corrected by being multiplied by 1.411 which is the correction coefficient for the rotation angle θ of −25 degrees illustrated in FIG. 16. Since the information read by the sensor pixel No. 0 is 145, the corrected white reference data is 145*1.411=205. The CPU 801 performs the multiplication of information read by the CIS 901 and a correction coefficient on all the angles and all the sensor pixels to generate a corrected white reference data group illustrated in FIG. 19A or 19B. The CPU 801 stores the generated white reference data group into the image memory 804. While in step S1511 the CPU 801 multiples the white reference data obtained in step S1508 by the correction coefficients for respective rotation angles θ illustrated in FIG. 16, the CPU 801 may multiply the black reference data obtained in step S1506 by the correction coefficients for respective rotation angles θ illustrated in FIG. 16.

In step S1512, the CPU 801 generates final white reference correction values (FIG. 20C or 20D) and black reference correction values (FIG. 20A or 20B) with respect to the CIS 901 from the white reference data group corrected in step S1511 (FIG. 19A or 19B) and the black reference data group obtained in step S1506 (FIG. 17A or 17B) which are stored in the image memory 804.

The CPU 801 calculates an average of the luminance values of each sensor pixel from −25 degrees to +5 degrees in the white reference data group (FIG. 19A) stored in the image memory 804, thereby calculating the white reference correction value of each sensor pixel when reading the second side (back side). FIG. 20C illustrates the white reference correction values of the respective sensor pixels when reading the second side. The CPU 801 calculates an average of the luminance values of each sensor pixel from −5 degrees to +25 degrees in the white reference data group (FIG. 19B) stored in the image memory 804, thereby calculating the white reference correction value of each sensor pixel when reading the first side (front side). FIG. 20D illustrates the white reference correction values of the respective sensor pixels when reading the first side.

The CPU 801 calculates an average of the luminance values of each sensor pixel from −25 degrees to +5 degrees (second range of angles) in the black reference data group (FIG. 17A) stored in the image memory 804, thereby calculating the black reference correction value of each sensor pixel when reading the second side (back side). FIG. 20A illustrates the black reference correction values of the respective sensor pixels when reading the second side. The CPU 801 calculates an average of the luminance values of each sensor pixel from −5 degrees to +25 degrees (first range of angles) in the black reference data group (FIG. 17B) stored in the image memory 804, thereby calculating the black reference correction value of each sensor pixel when reading the first side (front side). FIG. 20B illustrates the black reference correction values of the respective sensor pixels when reading the first side.

If luminance values stored in the image memory 804 fall outside a predetermined range, the luminance values outside the predetermined range may be excluded from the averaging in step S1511. Such luminance values are obtained if dust is attached to the white reference member 101 at the time of data acquisition of the white reference data group or if a part of the white reference member 101 is deteriorated due to aged deterioration. Such luminance values are excluded because the luminance values are not suitable to generate a white reference correction value.

Next, how the CPU 807 performs shading correction on luminance information about a read document G with use of the white reference correction values (FIGS. 20C and 20D) and the black reference correction values (FIGS. 20A and 20B) generated in step S1512 will be described.

The CPU 801 calculates a shading-corrected signal level $Vout_{(i)}$ based on equation (2) described below. In the following equation (2), $Vin_{(i)}$ (i=0 to 10367) is a luminance level of a document read by the image reading unit 100. As illustrated in FIG. 3, when the image reading unit 100 rotates to the position facing to the two-sided conveyance path 80 to read the first side of the document G, the CPU 801 uses the black reference correction values and the white reference correction values for reading the first side of the document G illustrated in FIGS. 20B and 20D. As illustrated in FIG. 5, when the image reading unit 100 rotates to the position facing to the document conveyance path 81 to read the second side of the document G, the CPU 801 uses the black reference correction values and the white reference correction values for reading the second side of the document G illustrated in FIGS. 20A and 20C.

$$Vout_{(i)} = \{Vin_{(i)} - \text{black reference correction value}_{(i)}\} \times \{255/(\text{white reference correction value}_{(i)} - \text{black reference correction value}_{(i)})\} \quad (2)$$

A value obtained by subtracting the black reference correction value of each sensor from the signal level of the sensor read from the image reading unit 100 is multiplied by the maximum luminance value 255 expected to be output which is divided by a difference of the white reference correction value from the black reference correction value. Thus, the CPU 801 obtains the shading-corrected signal level $Vout_{(i)}$. In equation (2), the value by which $Vin_{(i)}$ is multiplied is a shading correction coefficient. In other words, the shading correction coefficient is given by $\{255/(\text{white reference correction value}_{(i)} - \text{black reference correction value}_{(i)})\}$. The CPU 801 calculates first shading correction coefficients from the black reference correction values and the white reference correction values for reading the first side of the document G illustrated in FIGS. 20B and 20D. The CPU 801 calculates second shading correction coefficients from the black reference correction values and the white reference correction values for reading the second side of the document G illustrated in FIGS. 20A and 20C.

For example, when the CPU 801 performs shading correction for the second side (back side) on the sensor pixel No. 0 (the pixel 1301 in FIG. 12G), the sensor pixel No. 0 has a white reference correction value of 210 (item 2112 in FIG. 20C) and a black reference correction value of 10 (item 2012 in FIG. 20A). The resulting conversion equation for the shading correction is given by equation (3):

$$Vout_{(0)} = \{Vin_{(0)} - 10\} \times \{255/(210-10)\} \quad (3)$$

Figure 22:
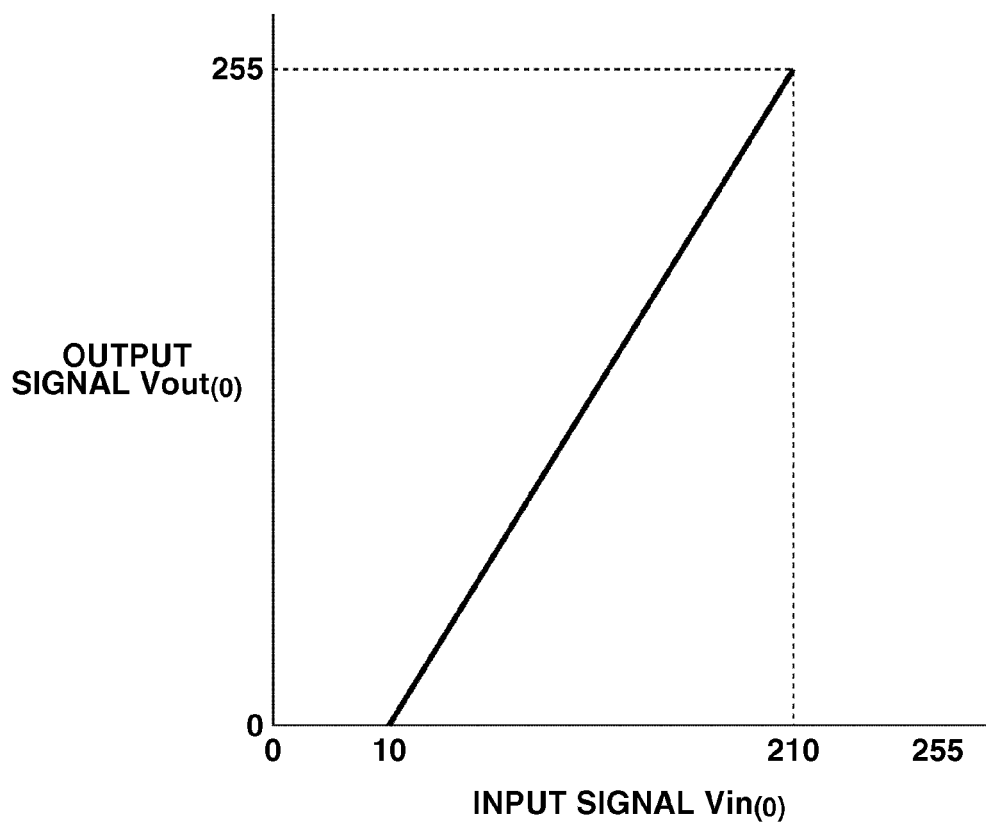
FIG. 22 illustrates an example of shading correction.

FIG. 22 is a graph illustrating the relationship between $Vin_{(0)}$ and $Vout_{(0)}$. For input $Vin_{(0)}$, output $Vout_{(0)}$ having a value normalized between 0 and 255 is obtained.

Similarly, when the CPU 801 performs shading correction for the first side (front side) on the sensor pixel No. 10367 (the pixel 1302 in FIG. 12G), the sensor pixel No. 10396 has a white reference correction value of 221 (item 2113 in FIG.

20D) and a black reference correction value of 10 (item 2013 in FIG. 20B). The resulting conversion equation for the shading correcting is given by equation (4):

$$Vout_{(10367)} = \{Vin_{(10367)} - 10\} * \{255/(221-10)\} \quad (4)$$

According to the first exemplary embodiment, the CPU 801 corrects the white reference correction values using the correction coefficients that are determined for respective rotation angles θ of the image reading unit 100 in advance. The CPU 801 then performs shading correction using the corrected white reference correction values. Consequently, even if the image reading unit 100 rotates to read the white reference member 101, the CPU 801 can calculate the white reference correction values with high accuracy.

The present exemplary embodiment deals with the case where the CPU 801 and the image memory 804 of the image processing apparatus 1 are used to execute the program for correcting the home position and the shading correction program. However, a controller connected to the image processing apparatus 1 may execute the programs.

A second exemplary embodiment deals with another method for detecting a deviation from the home position of the image reading unit 100 in step S1002 described in the first exemplary embodiment.

Figure 11:
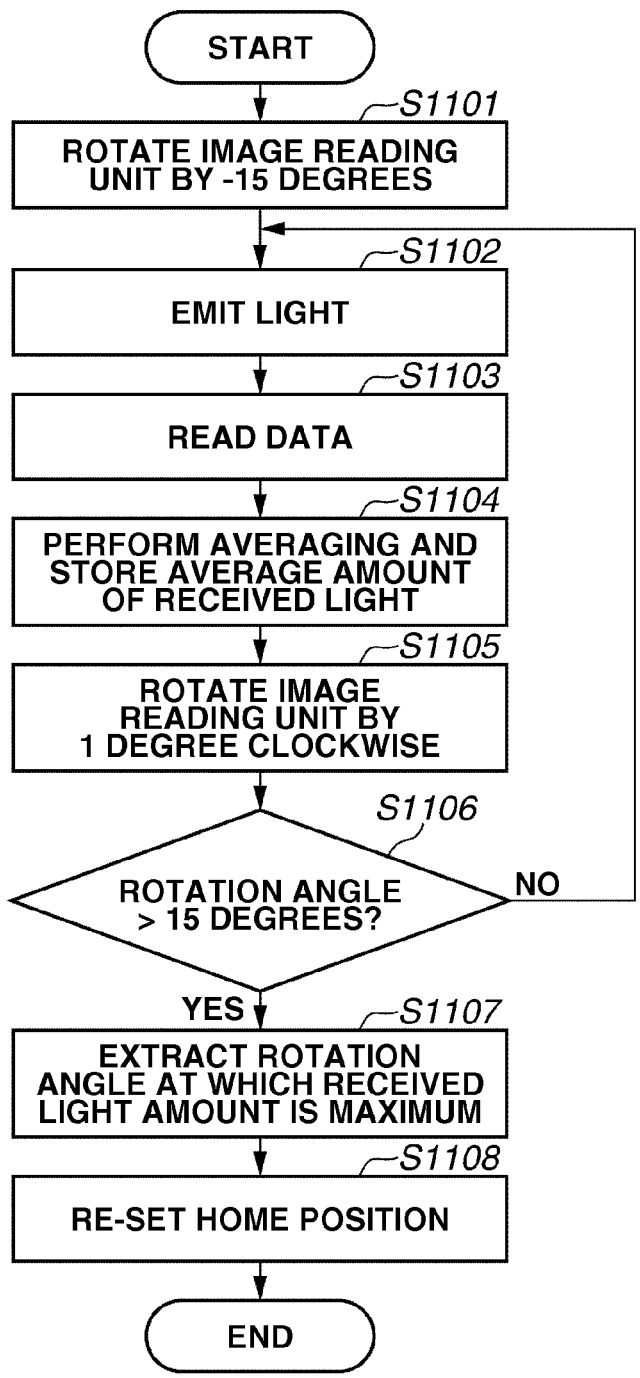
FIG. 11 is a flowchart for correcting a home position of an image reading unit according to a first exemplary embodiment.

According to the first exemplary embodiment, in step S1104 in FIG. 11, the CPU 801 performs the averaging processing on the amounts of received light for one line (L(i): i=0 to 10367) by using equation (1). According to the second exemplary embodiment, the CPU 801 divides a single line into three equal sections, calculates averages in the respective sections, and stores the averages into the image memory 804. FIG. 23A illustrates average amounts of received light of i=0th to 3455th pixels. FIG. 23B illustrates average amounts of received light of i=3456th to 6911th pixels. FIG. 23C illustrates average amounts of received light of i=6912th to 10367th pixels. The amounts of received light at respective rotation angles θ illustrated in FIGS. 23A, 23B, and 23C are stored in the image memory 804.

If the home position of the image reading unit 100 is in the position in FIG. 12B, the maximum values of the amounts of received light may be obtained at the same angle in any of the respective divided data groups. However, in FIG. 23A, a maximum value occurs at +2 degrees, in FIG. 23B, a maximum value occurs at 0 degrees, and in FIG. 23C, a maximum value occurs at −2 degrees. With such different angles, the data groups illustrated in FIGS. 23A to 23C show that the home position of the image reading unit 100 is tilted. If the home position of the image reading unit 100 is tilted, the CPU 801 notifies a user of the tilt of the home position of the image reading unit 100 via the operation unit 805.

Figure 24:
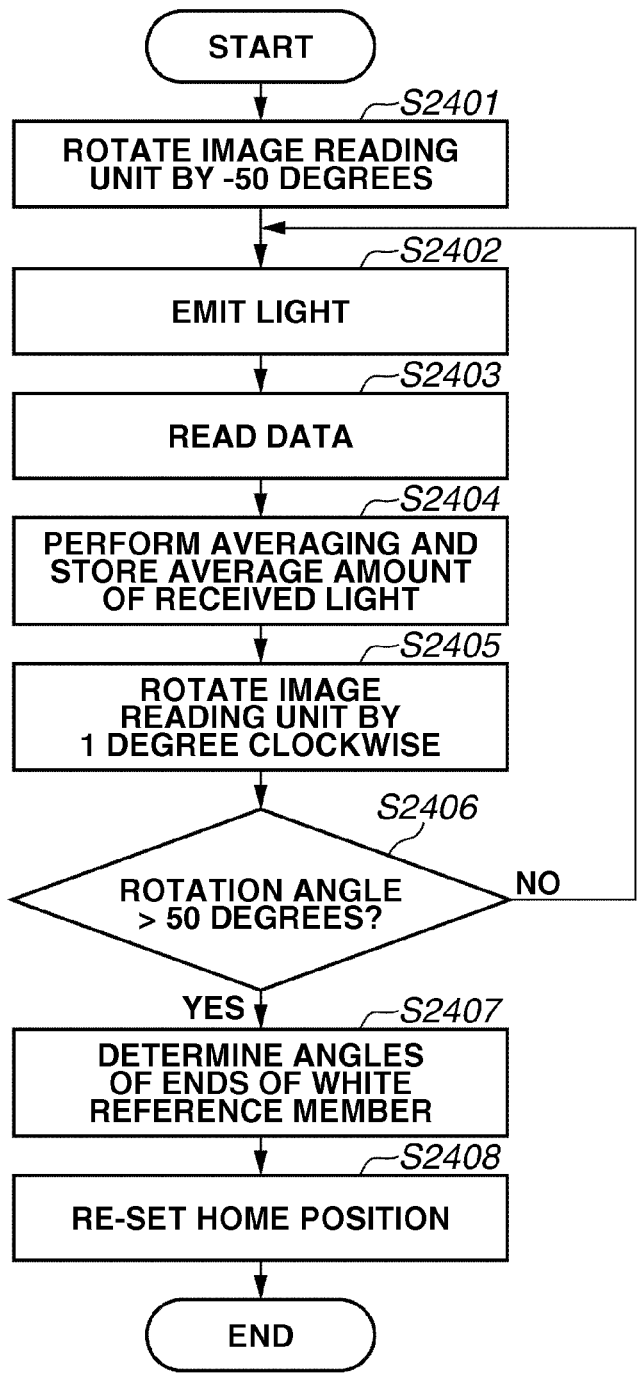
FIG. 24 is a flowchart for correcting the home position of the image reading unit according to the third exemplary embodiment.

A third exemplary embodiment deals with another method for correcting the home position of the image reading unit 100 in step S1002 in FIG. 10 described in the first exemplary embodiment. According to the third exemplary embodiment, end portions of the white reference member 101 are utilized to correct the home position. FIG. 24 is a flowchart illustrating home position correction processing performed by the image processing apparatus 1. According to the present exemplary embodiment, the CPU 801 executes a control program based on the flowchart to perform the following correction processing.

Processing in steps S2402 to S2405 in FIG. 24 is similar to that of steps S1102 to S1105 in FIG. 11 according to the first exemplary embodiment. Descriptions thereof are thus omitted. The processing in step S2401 in FIG. 24 differs from that in step S1101 in FIG. 11 only in the rotation angle θ. In step S1101, the image reading unit 100 is rotated to the position of −15 degrees. In step S2401, the image reading unit 100 is rotated to a position of −50 degrees. To rotate the image reading unit 100, the CPU 801 performs a similar control to that in step S1101 in FIG. 11.

The processing in step S2406 will be described. In step S2406, if the rotation angle θ is determined to be greater than 50 degrees (YES in step S2406), the CPU 801 advances the processing to step S2407. If the rotation angle θ is determined to be smaller than or equal to 50 degrees (NO in step S2406), the CPU 801 returns the processing to step S2402.

In step S2407, the CPU 801 refers to the amounts of received light (luminance information) at respective rotation angles θ stored in the image memory 804, to detect angles at which a difference in the amounts of received light between adjoining rotation angles θ is greater than or equal to a predetermined value. More specifically, in step S2407, the CPU 801 determines angles at which the amount of change of the luminance information between adjoining rotation angles θ is greater than or equal to a predetermined value. FIG. 13 illustrates the amounts of received light at respective rotation angles θ. In FIG. 13, such a difference is observed between the amount of received light at −48 degrees, 10 (item 2501 in FIG. 13) and the amount of received light at −47 degrees, 114 (item 2502 in FIG. 13), and between the amount of received light at +43 degrees, 120 (item 2503 in FIG. 13) and the amount of received light at +48 degrees, 10 (item 2504 in FIG. 13). The CPU 801 determines the angle of the left end of the white reference member 101 to be −48 degrees, and the angle of the right end to be +44 degrees.

The current home position of the image reading unit 100 is at the midpoint between the angle of the left end and that of the right end of the white reference position 101. In step S2408, the CPU 801 determines the sum of the angles of the right and left ends of the white reference member 101, divided by two, to be the angle (tilt angle) of the current home position of the image reading unit 100. For example, in the case in FIG. 13, the position of {+44 degrees+(−48 degrees)}/2=−2 degrees is determined to be the current home position. To correct the tilt angle of the image reading unit 100 to 0 degrees, the CPU 801 transmits a control signal to the ASIC 802 to control the two-sided drive motor 804 so that the image reading unit 100 rotates by 2 degrees clockwise from the current home position. The CPU 801 re-sets the rotated position as a new home position.

As described above, the CPU 801 can easily detect a deviation of the home position of the image reading unit 100 by rotating the image reading unit 100 and detecting angles at which a difference greater than or equal to a predetermined value occurs in the amount of light received from the white reference member 101.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (Trade Mark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-134836, filed Jun. 14, 2012, which is hereby incorporated by reference herein in its entirety.

What is claimed is:

1. An image processing apparatus comprising:
an acquisition unit configured to rotate an image reading unit including a sensor in units of predetermined angles to read a white reference member and acquire luminance information about the white reference member at the respective predetermined angles of rotation;
a determination unit configured to determine an angle at which the luminance information is greater than other pieces of the luminance information among a plurality of pieces of the luminance information acquired by the acquisition unit at the respective predetermined angles; and
a correction unit configured to rotate the image reading unit based on the angle determined by the determination unit to correct a reference position of the image reading unit.

2. The image processing apparatus according to claim 1, wherein the correction unit is configured to rotate the image reading unit by the determined angle in a direction such that the image reading unit approaches the white reference member and correct the reference position of the image reading unit.

3. The image processing apparatus according to claim 1, wherein a position at which the white reference member is read is different from a position at which a document is read.

4. The image processing apparatus according to claim 2, wherein a position at which the white reference member is read is on a rotational orbit of the image reading unit, between a position at which a first side of a document is read and a position at which a second side of the document is read.

5. An image processing apparatus comprising:
an acquisition unit configured to rotate an image reading unit including a sensor in units of predetermined angles to read a white reference member and acquire luminance information about the white reference member at the respective predetermined angles of rotation;
a determination unit configured to determine an angle at which an amount of change of the luminance information is greater than or equal to a predetermined value among a plurality of pieces of the luminance information acquired by the acquisition unit at the respective predetermined angles; and
a rotation control unit configured to calculate a tilt angle of the image reading unit based on the angle determined by the determination unit, and rotate the image reading unit to correct the calculated tilt angle.

6. A method for image processing, the method comprising:
rotating an image reading unit including a sensor in units of predetermined angles to read a white reference member, and acquiring luminance information about the white reference member at respective predetermined angles of rotation;
determining an angle at which the luminance information is greater than other pieces of the luminance information among a plurality of pieces of the acquired luminance information at the respective predetermined angles; and
rotating the image reading unit based on the determined angle to correct a reference position of the image reading unit.

7. A method for image processing, the method comprising:
rotating an image reading unit including a sensor in units of predetermined angles to read a white reference member, and acquiring luminance information about the white reference member at respective predetermined angles of rotation;
determining an angle at which an amount of change of the luminance information is greater than or equal to a predetermined value among a plurality of pieces of the acquired luminance information at the respective predetermined angles; and
calculating a tilt angle of the image reading unit based on the detected angle, and rotating the image reading unit to correct the calculated tilt angle.

8. A non-transitory computer readable storage medium encoded with instructions to perform the method according to claim 6.

9. A non-transitory computer readable storage medium encoded with instructions to perform the method according to claim 7.

* * * * *